(12) United States Patent
Wardle et al.

(10) Patent No.: US 12,479,728 B2
(45) Date of Patent: Nov. 25, 2025

(54) FABRICATION OF CARBON-BASED NANOSTRUCTURES ON METALLIC SUBSTRATES, INCLUDING ALUMINUM-CONTAINING SUBSTRATES

(71) Applicant: Massachusetts Institute of Technology, Cambridge, MA (US)

(72) Inventors: Brian L. Wardle, Lexington, MA (US); Kehang Cui, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1096 days.

(21) Appl. No.: 17/413,171

(22) PCT Filed: Dec. 13, 2019

(86) PCT No.: PCT/US2019/066279
§ 371 (c)(1),
(2) Date: Jun. 11, 2021

(87) PCT Pub. No.: WO2020/123974
PCT Pub. Date: Jun. 18, 2020

(65) Prior Publication Data
US 2022/0041451 A1 Feb. 10, 2022

Related U.S. Application Data

(60) Provisional application No. 62/780,116, filed on Dec. 14, 2018.

(51) Int. Cl.
*C01B 32/162* (2017.01)
*B01J 23/75* (2006.01)

(52) U.S. Cl.
CPC ............ *C01B 32/162* (2017.08); *B01J 23/75* (2013.01); *B01J 2235/00* (2024.01); *B01J 2235/30* (2024.01)

(58) Field of Classification Search
None
See application file for complete search history.

(56) References Cited

U.S. PATENT DOCUMENTS

| | | | |
|---|---|---|---|
| 9,150,418 B2 | 10/2015 | Boyd et al. | |
| 9,663,368 B2 | 5/2017 | Guzman de Villoria et al. | |
| 2005/0238810 A1 | 10/2005 | Scaringe et al. | |
| 2009/0117363 A1 | 5/2009 | Wardle et al. | |
| 2009/0297846 A1 | 12/2009 | Hata et al. | |
| 2010/0196695 A1 | 8/2010 | Garcia et al. | |
| 2010/0255303 A1 | 10/2010 | Wardle et al. | |
| 2010/0270069 A1 | 10/2010 | Shar et al. | |
| 2011/0162957 A1 | 7/2011 | Wardle et al. | |
| 2012/0164903 A1 | 6/2012 | Wardle et al. | |
| 2013/0142987 A1 | 6/2013 | Wardle et al. | |
| 2014/0126112 A1 | 5/2014 | Nguyen et al. | |
| 2014/0295098 A1 | 10/2014 | Shanov et al. | |
| 2014/0295166 A1 | 10/2014 | Steiner, III et al. | |
| 2015/0071849 A1 | 3/2015 | Steiner, III et al. | |
| 2015/0209761 A1 | 7/2015 | Cola | |
| 2019/0085138 A1 | 3/2019 | Lee et al. | |
| 2019/0189988 A1 | 6/2019 | Wardle et al. | |
| 2020/0123652 A1 | 4/2020 | Cui et al. | |
| 2020/0299135 A1 | 9/2020 | Wardle et al. | |
| 2022/0041450 A1 | 2/2022 | Wardle et al. | |

FOREIGN PATENT DOCUMENTS

| | | | |
|---|---|---|---|
| JP | 2004284919 A | * | 10/2004 |
| JP | 2005-279624 A | | 10/2005 |
| JP | 2010-180454 A | | 8/2010 |
| KR | 20070021757 A | * | 2/2007 |
| WO | WO 2001/047826 A1 | | 7/2001 |
| WO | WO 2007/136755 A2 | | 11/2007 |
| WO | WO 2020/124018 A1 | | 6/2020 |

OTHER PUBLICATIONS

Kim et al., KR-20070021757-A, Feb. 23, 2007 (machine translation) (Year: 2007).*
Taruya et al., JP-2004284919-A, Oct. 14, 2004 (machine translation) (Year: 2004).*
International Preliminary Report on Patentability for International Patent Application No. PCT/US2019/066279, mailed Jun. 24, 2021.
[No Author Listed], Vantablack Technical Data Sheet. Surrey Nanosystems Ltd. Newhaven, UK. 2016. Retrieved Jul. 14, 2019. 4 pages.
Acauan et al., Direct synthesis of carbon nanomaterials via surface activation of bulk copper. Carbon. 2021;177:1-10. Epub Feb. 11, 2021. Supplementary Material included. 19 pages total.
Adams et al., Carbon Anodes for Nonaqueous Alkali Metal-Ion Batteries and Their Thermal Safety Aspects. Advanced Energy Materials. Sep. 19, 2019;9(35):1900550. Epub Aug. 5, 2019. 27 pages.
Aitola et al., High Temperature-Stable Perovskite Solar Cell Based on Low-Cost Carbon Nanotube Hole Contact. Advanced Materials. May 3, 2017;29(17):1606398. Epub Feb. 23, 2017. 5 pages.
Akselrod et al., Large-Area Metasurface Perfect Absorbers from Visible to Near-Infrared. Advanced Materials. Dec. 22, 2015;27(48):8028-34. Epub Nov. 9, 2015.
Akutsu et al., Vacuum and cryogenic compatible black surface for large optical baffles in advanced gravitational-wave telescopes. Optical Materials Express. Apr. 13, 2016;6(5):1613-26.

(Continued)

*Primary Examiner* — Cheng Yuan Huang
(74) *Attorney, Agent, or Firm* — Wolf, Greenfield & Sacks, P.C.

(57) ABSTRACT

Systems and methods for the fabrication of elongated carbon-based nanostructures on metallic substrates, including aluminum-containing substrates, are generally described. Inventive articles comprising elongated carbon-based nanostructures and metallic substrates are also described. Also described herein are articles that absorb a relatively large percentage of electromagnetic radiation over relatively broad ranges of wavelengths.

14 Claims, 21 Drawing Sheets

(56) References Cited

OTHER PUBLICATIONS

Anothumakkool et al., Peculiar Li-storage mechanism at graphene edges in turbostratic carbon black and their application in high energy Li-ion capacitor. Journal of Power Sources. Feb. 28, 2018;378:628-35. Epub Jan. 12, 2018.

Armbrüster et al., $Al_{13}Fe_4$ as a low-cost alternative for palladium in heterogeneous hydrogenation. Nature Materials. 2012;11:690-3. Epub Jun. 10, 2012.

Avraham et al., Patterned growth of carbon nanotube forests using Cu and Cu/Ag thin film reservoirs as growth inhibitors. Carbon. Apr. 2018;130:273-80. Epub Jan. 8, 2018.

Baturina et al., CO2 Electroreduction to Hydrocarbons on Carbon-Supported Cu Nanoparticles. ACS Catal. 2014;4(10):3682-95. Epub Sep. 3, 2014.

Bauman et al., Effect of Mo on the catalytic activity of Ni-based self-organizing catalysts for processing of dichloroethane into segmented carbon nanomaterials. Heliyon. 2019;5:e02428. Epub Sep. 6, 2019. 10 pages.

Berthelot, Hebd. Seances Acad. Sci. 1866;62:905.

Cao et al., End-bonded contacts for carbon nanotube transistors with low, size-independent resistance. Science. Oct. 2, 2015;350(6256):68-72.

Chen et al., A robust fuel cell operated on nearly dry methane at 500° C. enabled by synergistic thermal catalysis and electrocatalysis. Nature Energy. 2018;3:1042-50. Epub Oct. 29, 2018.

Chen et al., Highly Flexible and Efficient Solar Steam Generation Device. Adv. Mater. 2017;29:1701756. Epub Jun. 12, 2017. 8 pages.

Cheng et al., Graphene-Like-Graphite as Fast-Chargeable and High-Capacity Anode Materials for Lithium Ion Batteries. Scientific Reports. 2017;7:14782. Epub Nov. 1, 2017. 14 pages.

Cheng et al., Hydrogen spillover in the context of hydrogen storage using solid-state materials. Energy Environ. Sci. 2008;1:338-54. Epub Jul. 3, 2008.

Chhoker et al., Field emission properties of carbon nanostructures: A review. 2007 International Workshop on Physics of Semiconductor Devices. IEEE. Mumbai, India. 2007:6 pages.

Chiang et al., Linking catalyst composition to chirality distributions of as-grown single-walled carbon nanotubes by tuning Ni(x)Fe(1-x) nanoparticles. Nat Mater. Nov. 2009;8(11):882-6. doi: 10.1038/nmat2531. Epub Sep. 20, 2009.

Cola et al., Increased real contact in thermal interfaces: A carbon nanotube/foil material. Applied Physics Letters. 2007;90:093513. Epub Mar. 2, 2007. 3 pages.

Cross, Processing Vertically Aligned Carbon Nanotubes for Heat Transfer Applications. Masters Thesis. Georgia Institute of Technology. Dec. 2008:121 pages.

Cui et al., Breakdown of Native Oxide Enables Multifunctional, Free-Form Carbon Nanotube-Metal Hierarchical Architectures. ACS Appl Mater Interfaces. Sep. 25, 2019;11(38):35212-35220. Epub Sep. 12, 2019. Pre-publication version provided. Supporting information included. 15 pages total.

Cui et al., Multifunctional graphene and carbon nanotube films for planar heterojunction solar cells. Progress in Energy and Combustion Science. Jan. 2019; 70:1-21. Epub Sep. 26, 2018.

Cui et al., Scalable and Solid-State Redox Functionalization of Transparent Single-Walled Carbon Nanotube Films for Highly Efficient and Stable Solar Cells. Adv. Energy Mater. 2017;7:1700449. Epub May 12, 2017. 8 pages.

Cui et al., Synthesis of subnanometer-diameter vertically aligned single-walled carbon nanotubes with copper-anchored cobalt catalysts. Nanoscale. 2016;8(3):1608-17. Epub Dec. 2, 2015. Author manuscript provided. 13 pages.

Dervishi et al., Raman spectroscopy of bottom-up synthesized graphene quantum dots: size and structure dependence. Nanoscale. 2019; 11:16571-81. Epub Aug. 22, 2019.

Dhanya et al., Lightning strike effect on carbon fiber reinforced composites—effect of copper mesh protection. Materials Today Communications. Sep. 2018; 16:124-34. Epub May 26, 2018.

Ding et al., Superresilient Hard Carbon Nanofabrics for Sodium-Ion Batteries. Small. Mar. 19, 2020;16(11):1906883. Epub Feb. 20, 2020. 9 pages.

Dresselhaus et al., Topics in Applied Physics. Nanotechnology. Carbon nanotubes: synthesis, structure, properties, and applications. P. eds. 2001. Springer. vol. 80. 461 pages.

Dutkiewicz et al., Microstructure and properties of bulk copper matrix composites strengthened with various kinds of graphene nanoplatelets. Materials Science and Engineering: A. Mar. 25, 2015;628:124-34. Epub Jan. 15, 2015.

Enoki et al., Electronic structures of graphene edges and nanographene. International Reviews in Physical Chemistry. 2007;26(4):609-45. Epub Oct. 16, 2007.

Fajardo-Díaz et al., Synthesis, characterization and cyclic voltammetry studies of helical carbon nanostructures produced by thermal decomposition of ethanol on Cu-foils. Carbon. Dec. 2019;155:469-82. Epub Sep. 4, 2019.

Fan et al., Nanographene-Constructed Carbon Nanofibers Grown on Graphene Sheets by Chemical Vapor Deposition: High-Performance Anode Materials for Lithium Ion Batteries. ACS Nano. 2011;5(4):2787-94. Epub Mar. 22, 2011.

Faramarzi et al., Stepwise Melting Model for the Formation Mechanism of Ni Catalyst Nanoparticles for Carbon Nanotube Growth. J. Phys. Chem. C. 2011;115(39):18958-66. Epub Aug. 29, 2011.

Ferrari et al., Interpretation of Raman spectra of disordered and amorphous carbon. Phys. Rev. B. May 15, 2000;61(20):14095-107.

Ferrari et al., Origin of the 1150—cm-1 Raman mode in nanocrystalline diamond. Phys. Rev. B. Mar. 13, 2001;63(12):121405. 4 pages.

Fiawoo et al., Evidence of correlation between catalyst particles and the single-wall carbon nanotube diameter: a first step towards chirality control. Phys Rev Lett. May 11, 2012;108(19):195503. doi: 10.1103/PhysRevLett.108.195503. Epub May 8, 2012. 5 pages.

Ghosh et al., Vertically aligned and tree-like carbon nanostructures as anode of lithium ion battery. Diamond and Related Materials. Aug. 2018;87:56-60. Epub May 17, 2018.

Gorbatikh et al., Hierarchical lightweight composite materials for structural applications. MRS Bulletin. 2016;41:672-7. Epub Sep. 8, 2016.

Guo et al., Active sites of nitrogen-doped carbon materials for oxygen reduction reaction clarified using model catalysts. Science. Jan. 22, 2016;351(6271):361-5. doi: 10.1126/science.aad0832.

Hafner et al., Surfaces of Complex Intermetallic Compounds: Insights from Density Functional Calculations. Acc. Chem. Res. 2014;47(11):3378-84. Epub Apr. 17, 2014.

Hao et al., Brazed Carbon Nanotube Arrays: Decoupling Thermal Conductance and Mechanical Rigidity. Advanced Materials Interfaces. Mar. 9, 2017;4(5): 1601042. Epub Jan. 27, 2017. 8 pages.

He et al., A review on the status and challenges of electrocatalysts in lithium-sulfur batteries. Energy Storage Materials. Jul. 2019;20:55-70. Epub May 7, 2019.

He et al., Anomalous interface adhesion of graphene membranes. Scientific Reports. 2013;3:2660. Epub Sep. 16, 2013. 7 pages.

Heidenreich et al., A test object and criteria for high resolution electron microscopy. Journal of Applied Crystallography. 1968;1:1-19.

Hirsch, The era of carbon allotropes. Nature Materials. 2010;9:868-71. Epub Oct. 22, 2010.

Hou et al., Extended alcohol catalytic chemical vapor deposition for efficient growth of single-walled carbon nanotubes thinner than (6,5). Carbon. Aug. 2017;119:502-10. Epub Apr. 23, 2017.

Hsiao et al., Growth of a superhydrophobic multi-walled carbon nanotube forest on quartz using flow-vapor-deposited copper catalysts. Carbon. Nov. 2017;124:637-41. Epub Sep. 9, 2017.

Hu et al., Morphology and chemical state of Co—Mo catalysts for growth of single-walled carbon nanotubes vertically aligned on quartz substrates. Journal of Catalysis. Jul. 1, 2004;225(1):230-9. Epub May 18, 2004.

Hu et al., Raman spectroscopy study of the transformation of the carbonaceous skeleton of a polymer-based nanoporous carbon along the thermal annealing pathway. Carbon. Apr. 2015;85:147-58. Epub Jan. 2, 2015.

(56) References Cited

OTHER PUBLICATIONS

Hu et al., Tailoring Graphene Oxide-Based Aerogels for Efficient Solar Steam Generation under One Sun. Adv. Mater. 2017;29:1604031. Epub Nov. 25, 2016. 5 pages.

Huang et al., Nano effects of helium plasma treatment carbon nanotubes coating basalt filament. Mater. Sci. Forum. Jan. 2009;610-613:722-7.

Huang et al., Single layer nano graphene platelets derived from graphite nanofibres. Nanoscale. 2016;8:8810-8. Epub Apr. 4, 2016. Author manuscript provided. 9 pages.

Huang et al., Temperature effect on the formation of catalysts for growth of carbon nanofibers. Carbon. Mar. 2009;47(3):795-803. Epub Nov. 27, 2008.

Iyengar et al., Ultralow reflectance metal surfaces by ultrafast laser texturing. Applied Optics. 2010;49(31):5983-8. Epub Oct. 21, 2010.

Jaiswal et al., Iron-based nanocatalyst for the acceptorless dehydrogenation reactions. Nature Communications. 2017;8:2147. Epub Dec. 15, 2017. 13 pages.

Jian et al., Gas-Induced Formation of Cu Nanoparticle as Catalyst for High-Purity Straight and Helical Carbon Nanofibers. ACS Nano. 2012;6(10):8611-9. Epub Sep. 10, 2012.

Jin et al., Covalently Connected Carbon Nanostructures for Current Collectors in Both the Cathode and Anode of Li—S Batteries. Advanced Materials. Nov. 2, 2016;28(41):9094-102. Epub Sep. 8, 2016.

Karwa et al., Scaled-up self-assembly of carbon nanotubes inside long stainless steel tubing. Carbon. Jun. 2006; 44(7): 1235-42.

Kaur et al., Enhanced thermal transport at covalently functionalized carbon nanotube array interfaces. Nature Communications. 2014;5:3082. Epub Jan. 22, 2014. 8 pages.

Khan et al., Electrical transport properties of $Ni_{95}Ti_5$ catalyzed multi wall carbon nanotubes film. J. Nanomat. Apr. 2009; 2009(2): 1-8.

Kharissova et al., Variations of interlayer spacing in carbon nanotubes. RSC Adv. 2014;4:30807-15. Epub Jun. 19, 2014.

Kim et al., Graphene modified copper current collector for enhanced electrochemical performance of Li-ion battery. Scripta. Mater. Mar. 15, 2018;146:100-4. Epub Nov. 20, 2017.

Kim et al., Reduction of CuO and Cu2O with H2: H Embedding and Kinetic Effects in the Formation of Suboxides. J. Am. Chem. Soc. 2003;125(35):10684-92. Epub Aug. 6, 2003.

Kim et al., The interaction of hydrocarbons with copper-nickel and nickel in the formation of carbon filaments. Journal of Catalysis. Sep. 1991;131(1):60-73.

Kol'tsova et al., Synthesis of carbon nanofibers on copper particles. Tech. Phys. Aug. 2015; 60(8): 1214-19.

Koutras et al., Influence of temperature on the strength of resistance welded glass fibre reinforced PPS joints. Composites Part A: Applied Science and Manufacturing. Feb. 2018;105:57-67. Epub Nov. 6, 2017.

Kudo et al., Mechanisms of titania nanoparticle mediated growth of turbostratic carbon nanotubes and nanofibers. Journal of Applied Physics. 2017;122:014301. Epub Jul. 6, 2017. 10 pages.

Kwon et al., Direct Chemical Synthesis of Plasmonic Black Colloidal Gold Superparticles with Broadband Absorption Properties. Nano Lett. Sep. 12, 2018;18(9):5927-5932. doi: 10.1021/acs.nanolett. 8b02629. Epub Aug. 8, 2018.

Lahiri et al., High Capacity and Excellent Stability of Lithium Ion Battery Anode Using Interface-Controlled Binder-Free Multiwall Carbon Nanotubes Grown on Copper. ACS Nano. 2010;4(6):3440-6. Epub May 4, 2010.

Lee et al., Aligned Carbon Nanotube Film Enables Thermally Induced State Transformations in Layered Polymeric Materials. ACS Appl. Mater. Interfaces. 2015;7(16):8900-5. Epub Apr. 15, 2015.

Lehman et al., Carbon nanotube-based black coatings. Applied Physics Reviews. 2018;5:011103. Epub Feb. 15, 2018. 17 pages.

Lehman et al., Very Black Infrared Detector from Vertically Aligned Carbon Nanotubes and Electric-Field Poling of Lithium Tantalate. Nano Lett. 2010;10(9):3261-6. Epub Aug. 3, 2010.

Lespade et al., Caracterisation de materiaux carbones par microspectrometrie Raman. Carbon. 1984;22(4-5):375-85.

Li et al., Low-Temperature Growth of Carbon Nanotubes Catalyzed by Sodium-Based Ingredients. Angewandte Chemie International Edition. Jul. 1, 2019;58(27):9204-9. Epub May 27, 2019.

Liang et al., Interwoven MXene Nanosheet/Carbon-Nanotube Composites as Li—S Cathode Hosts. Adv. Mater. 2017;29:1603040. Epub Nov. 14, 2016. 7 pages.

Liatard et al., Vertically-aligned carbon nanotubes on aluminum as a light-weight positive electrode for lithium-polysulfide batteries. Chemical Communications. 2015;51(36):7749-52. Epub Apr. 2, 2015.

Lin et al., Carbon Nanotube Sponges, Aerogels, and Hierarchical Composites: Synthesis, Properties, and Energy Applications. Advanced Energy Materials. Sep. 7, 2016;6(17):1600554. Epub Jun. 14, 2016. 26 pages.

Lin et al., Chlorine effect on formation of turbostratic carbon nanofibers by a mixture of 1,2-dichloroethane and ethanol. Journal of the Taiwan Institute of Chemical Engineers. Jul. 2014;45(4):1883-91. Epub Nov. 28, 2013.

Liu et al., Pitch-Derived Soft Carbon as Stable Anode Material for Potassium Ion Batteries. Advanced Materials. Apr. 28, 2020;32(17):2000505. Epub Mar. 12, 2020. 8 pages.

López et al., Electronic Effects in the Activation of Supported Metal Clusters: Density Functional Theory Study of H2 Dissociation on Cu/SiO2. The Journal of Physical Chemistry B. 1999;103(40):8552-7. Epub Sep. 18, 1999.

Mallet-Ladeira et al., A Raman study to obtain crystallite size of carbon materials: A better alternative to the Tuinstra-Koenig law. Carbon. Dec. 2014;80:629-39. Epub Sep. 15, 2014.

Mao et al., Foldable interpenetrated metal-organic frameworks/carbon nanotubes thin film for lithium-sulfur batteries. Nature Communications. 2017;8:14628. Epub Mar. 6, 2017. 8 pages.

Mccafferty et al., Thermodynamics of Corrosion: Pourbaix Diagrams. Introduction to Corrosion Science. Springer, New York, NY. Nov. 2009;95-117.

Mecklenburg et al., Aerographite: Ultra Lightweight, Flexible Nanowall, Carbon Microtube Material with Outstanding Mechanical Performance. Advanced Materials. Jul. 10, 2012;24(26):3486-90. Epub Jun. 12, 2012.

Meng et al., Advances in Structure and Property Optimizations of Battery Electrode Materials. Joule. Nov. 15, 2017;1:522-47.

Meshot et al., Engineering Vertically Aligned Carbon Nanotube Growth by Decoupled Thermal Treatment of Precursor and Catalyst. ACS Nano. 2009;3(9):2477-86. Epub Aug. 19, 2009.

Miao et al., Growth of carbon nanotubes on transition metal alloys by microwave-enhanced hot-filament deposition. Thin Solid Films. Jul. 22, 2005; 484(1-2): 58-63.

Miura et al., Millimeter-tall carbon nanotube arrays grown on aluminum substrates. Carbon. Apr. 2018;130:834-42. Epub Feb. 9, 2018. Corrigendum included. 2018;133:77.

Mizuno et al., A black body absorber from vertically aligned single-walled carbon nanotubes. PNAS. Apr. 2009;106(15):6044-7.

Nasibi et al., Nanoporous carbon black particles as an electrode material for electrochemical double layer capacitors. Materials Letters. Jan. 15, 2013;91:323-5. Epub Oct. 5, 2012.

Nasibulina et al., Direct synthesis of carbon nanofibers on the surface of copper powder. Carbon. Dec. 2010; 48(15):4559-62.

Nessim et al., Low temperature synthesis of vertically aligned carbon nanotubes with electrical contact to metallic substrates enabled by thermal decomposition of the carbon feedstock. Nano Lett. Oct. 2009;9(10):3398-405.

Nessim et al., The critical role of the underlayer material and thickness in growing vertically aligned carbon nanotubes and nanofibers on metallic substrates by chemical vapor deposition. Advanced Functional Materials. Apr. 14, 2010; 20(8): 1306-12.

Ni et al., Three dimensional porous frameworks for lithium dendrite suppression. Journal of Energy Chemistry. May 2020;44:73-89. Epub Oct. 1, 2019.

Pimenta et al., Studying disorder in graphite-based systems by Raman spectroscopy. Physical Chemistry Chemical Physics. 2007;9:1276-91. Epub Jan. 11, 2007.

(56) References Cited

OTHER PUBLICATIONS

Pitkänen et al., On-chip integrated vertically aligned carbon nanotube based super- and pseudocapacitors. Scientific Reports. 2017;7:16594. Epub Nov. 29, 2017. 7 pages.

Pitkänen et al., The Effect of Al Buffer Layer on the Catalytic Synthesis of Carbon Nanotube Forests. Top. Catal. 2015;58(14-17):1112-8. Epub Aug. 18, 2015.

Prins, Hydrogen spillover. Facts and fiction. Chem Rev. May 9, 2012;112(5):2714-38. doi: 10.1021/cr200346z. Epub Feb. 10, 2012.

Puech et al., Analyzing the Raman Spectra of Graphenic Carbon Materials from Kerogens to Nanotubes: What Type of Information Can Be Extracted from Defect Bands? Journal of Carbon Research. 2019;5(4):69. Epub Nov. 1, 2019. 20 pages.

Qian et al., Multifunctional Structural Supercapacitor Composites Based on Carbon Aerogel Modified High Performance Carbon Fiber Fabric. ACS Appl. Mater. Interfaces. 2013;5(13):6113-22. Epub May 13, 2013.

Qin et al., Effect of synthesis method of nanocopper catalysts on the morphologies of carbon nanofibers prepared by catalytic decomposition of acetylene. Journal of Catalysis. Apr. 25, 2004;223(2):389-94. Epub Mar. 19, 2004.

Rao et al., Carbon Nanotubes and Related Nanomaterials: Critical Advances and Challenges for Synthesis toward Mainstream Commercial Applications. ACS Nano. 2018;12:11756-84. Epub Dec. 5, 2018.

Reit et al., Growth time performance dependence of vertically aligned carbon nanotube supercapacitors grown on aluminum substrates. Electrochimica Acta. Feb. 2013;91:96-100. Epub Jan. 4, 2013.

Ren et al., Acetylene decomposition to helical carbon nanofibers over supported copper catalysts. Materials Research Bulletin. Dec. 4, 2007;42(12):2202-10. Epub Jan. 11, 2007.

Rodriguez et al., Catalytic Engineering of Carbon Nanostructures. Langmuir. Oct. 1, 1995;11(10):3862-6.

Röthlisberger et al., Investigating the mechanism of collective bidirectional growth of carbon nanofiber carpets on metallic substrates. Carbon. Nov. 2013;63:498-507. Epub Jul. 13, 2013.

Sakurai et al., Role of Subsurface Diffusion and Ostwald Ripening in Catalyst Formation for Single-Walled Carbon Nanotube Forest Growth. J. Am. Chem. Soc. 2012;134(4):2148-53. Epub Dec. 23, 2011.

Sanjabi et al., Modeling of the Heterogeneous Formation of Ni Catalyst Particles for Carbon Nanotube Growth. J. Phys. Chem. C. 2009;113(20):8652-9. Epub Apr. 23, 2009.

Saurel et al., A SAXS outlook on disordered carbonaceous materials for electrochemical energy storage. Energy Storage Materials. Sep. 2019;21:162-73. Epub May 15, 2019. Corrigendum included. 2020;28:418.

Schäffel et al., Tailoring the diameter, density and number of walls of carbon nanotubes through predefined catalyst particles. Physical Status Solidi A. Jun. 2008;205(6):1382-5. Epub May 29, 2008.

Schuepfer et al., Assessing the structural properties of graphitic and non-graphitic carbons by Raman spectroscopy. Carbon. May 2020;161:359-72. Epub Jan. 19, 2020.

Schwan et al., Raman spectroscopy on amorphous carbon films. Journal of Applied Physics. 1996;80(1):440-7. Epub Aug. 17, 1998.

Shaikjee et al., The effect of copper catalyst reducibility on low temperature carbon fiber synthesis. Materials Chemistry and Physics. Feb. 15, 2011;125(3):899-907. Epub Oct. 30, 2010.

Shaikjee et al., The synthesis, properties and uses of carbon materials with helical morphology. Journal of Advanced Research. Jul. 2012;3(3):195-223. Epub Aug. 3, 2011.

Shaikjee et al., The use of transmission electron microscopy tomography to correlate copper catalyst particle morphology with carbon fiber morphology. Carbon. Aug. 2011;49(9):2950-9. Epub Mar. 6, 2011.

Smith et al., Structural analysis of char by Raman spectroscopy: Improving band assignments through computational calculations from first principles. Carbon. Apr. 2016;100:678-92. Epub Jan. 13, 2016.

Sourmail, Near equiatomic FeCo alloys: Constitution, mechanical and magnetic properties. Progress in Materials Science. Sep. 7, 2005;50(7):816-80. Epub Jun. 14, 2005.

Spinelli et al., Broadband omnidirectional antireflection coating based on subwavelength surface Mie resonators. Nature Communications. 2012;3:692. Epub Feb. 21, 2012. 5 pages.

Stein et al., Mesoscale evolution of non-graphitizing pyrolytic carbon in aligned carbon nanotube carbon matrix nanocomposites. Journal of Materials Science. 2017;52:13799-811. Epub Aug. 22, 2017.

Su et al., Natural lavas as catalysts for efficient production of carbon nanotubes and nanofibers. Angew Chem Int Ed Engl. 2007;46(11):1823-4.

Subramaniam et al., One hundred fold increase in current carrying capacity in a carbon nanotube-copper composite. Nature Communications. 2013;4:2202. Epub Jul. 23, 2013. 7 pages.

Sun et al., Precipitation strengthening of aluminum alloys by room-temperature cyclic plasticity. Science. Mar. 1, 2019;363(6430):972-975. doi: 10.1126/science.aav7086.

Sun et al., Super Black Material from Low-Density Carbon Aerogels with Subwavelength Structures. ACS Nano. 2016;10:9123-8. Epub Sep. 2, 2016.

Szabó et al., Influence of synthesis parameters on CCVD growth of vertically aligned carbon nanotubes over aluminum substrate. Sci. Rep. Aug. 2007; 7(9557): 1-11.

Tajima et al., A first principles study on the CVD graphene growth on copper surfaces: A carbon atom incorporation to graphene edges. Surface Science. Nov. 2016;653:123-9. Epub Jun. 26, 2016.

Talapatra et al., Direct growth of aligned carbon nanotubes on bulk metals. Nat Nanotechnol. Nov. 2006;1(2):112-6. doi: 10.1038/nnano.2006.56. Epub Oct. 22, 2006.

Teblum et al., Millimeter-tall carpets of vertically aligned crystalline carbon nanotubes synthesized on copper substrates for electrical applications. The Journal of Physical Chemistry C. Jul. 2014; 118(33): 19345-55.

Tian et al., Surface structure deduced differences of copper foil and film for graphene CVD growth. Applied Surface Science. May 1, 2014;300:73-9. Epub Feb. 15, 2014.

Tong et al., Dense Vertically Aligned Multiwalled Carbon Nanotube Arrays as Thermal Interface Materials. IEEE Trans. Compon. Packag. Technol. Mar. 2007;30:92-100.

Tsaneva et al., Assessment of the structural evolution of carbons from microwave plasma natural gas reforming and biomass pyrolysis using Raman spectroscopy. Carbon. Dec. 2014;80:617-28. Epub Sep. 15, 2014.

Tsuji et al., Unexpected Efficient Synthesis of Millimeter-Scale Single-Wall Carbon Nanotube Forests Using a Sputtered MgO Catalyst Underlayer Enabled by a Simple Treatment Process. J. Am. Chem. Soc. 2016;138(51):16608-11. Epub Dec. 15, 2016.

Uemoto et al., Electrochemical Carbon Dioxide Reduction in Methanol at Cu and Cu2O-Deposited Carbon Black Electrodes. ChemEngineering. 2019;3(1):15. Epub Feb. 8, 2019. 10 pages.

Vander Wal et al., Substrate-support interactions in metal-catalyzed carbon nanofiber growth. Carbon. Dec. 2001;39(15):2277-89. Epub Oct. 29, 2001.

Wardle et al., Advanced Nanoengineered Materials. Aerospace Materials and Applications, Chapter 4. American Institute of Aeronautics and Astronautics, Inc. 2018:275-304.

Wu et al., Thin-walled carbon nanotubes grown using a zirconium catalyst. Carbon. Jun. 2010; 48(7): 1897-901.

Wu et al., Raman spectroscopy of graphene-based materials and its applications in related devices. Chemical Society Reviews. 2018;47(5):1822-73. Epub Jan. 25, 2018.

Wu et al., Synthesis and hydrogen storage capacity of exfoliated turbostratic carbon nanofibers. International Journal of Hydrogen Energy. May 2010;35(9):4123-30. Epub Mar. 11, 2010.

Xu et al., Carbon nanomaterials for advanced lithium sulfur batteries. Nano Today. Apr. 2018;19:84-107. Epub Mar. 7, 2018.

Yang et al., Liquid-Like, Self-Healing Aluminum Oxide during Deformation at Room Temperature. Nano Lett. 2018;18(4):2492-7. Epub Feb. 28, 2018.

Yang et al., Selective electrochemical reduction of $CO_2$ by a binder-free platinum/nitrogen-doped carbon nanofiber/copper foil

(56) References Cited

OTHER PUBLICATIONS catalyst with remarkable efficiency and reusability. Electrochemistry Communications. Aug. 2018;93:138-42. Epub Jun. 30, 2018.

Yehezkel et al., Distinct Copper Electrodeposited Carbon Nanotubes (CNT) Tissues as Anode Current Collectors in Li-ion Battery. Electrochimica Acta. Mar. 1, 2017;229:404-14. Epub Jan. 27, 2017.

Yi et al., CVD growth and field electron emission of aligned carbon nanotubes on oxidized Inconel plates without addition of catalyst. Diam. Rel. Mater. Jul.-Sep. 2010; 19(7-9): 870-4.

Yin et al., Extremely Black Vertically Aligned Carbon Nanotube Arrays for Solar Steam Generation. ACS Appl. Mater. Interfaces. 2017;9(34):28596-603. Epub Aug. 3, 2017.

Yonezawa et al., Detailed investigation of the reduction process of cupric oxide (CuO) to form metallic copper fine particles with a unique diameter. Journals of Materials Science. 2010;45:6433-9. Epub Jul. 7, 2010.

Yu et al., Effect of an Auxiliary Plate on Passive Heat Dissipation of Carbon Nanotube-Based Materials. Nano Lett. Mar. 14, 2018;18(3):1770-1776. doi: 10.1021/acs.nanolett.7b04933. Epub Mar. 1, 2018.

Yu et al., Low-temperature synthesis of carbon nanofibers by decomposition of acetylene with a catalyst derived from cupric nitrate. Chemical Engineering Journal. Nov. 1, 2008;144(3):514-7. Epub Aug. 5, 2008.

Yu et al., Supercapacitor electrode materials: nanostructures from 0 to 3 dimensions. Energy & Environmental Science. 2015;8:702-30. Epub Dec. 3, 2014.

Yu et al., Superelastic Hard Carbon Nanofiber Aerogels. Advanced Materials. Jun. 6, 2019;31(23):1900651. Epub Apr. 15, 2019. 9 pages.

Zanin et al., Field Emission from Hybrid Diamond-like Carbon and Carbon Nanotube Composite Structures. ACS Appl Mater Interfaces. 2013;5(23):12238-43. Epub Nov. 13, 2013.

Zhang et al., Bending Ultrathin Graphene at the Margins of Continuum Mechanics. Physical Review Letters. Jun. 2011;106:255503. 4 pages.

Zhang et al., Bonding-geometry dependence of fractal growth on metal surfaces. Phys Rev Lett. Sep. 26, 1994;73(13):1829-1832. doi: 10.1103/PhysRevLett.73.1829.

Zhang et al., Carbon enables the practical use of lithium metal in a battery. Carbon. Oct. 2017;123:744-55. Epub Aug. 14, 2017.

Zhang et al., Unmasking chloride attack on the passive film of metals. Nature Communications. 2018;9:2559. Epub Jul. 2, 2018. 9 pages.

Zhao et al., Direct growth of carbon nanotubes on metal supports by chemical vapor deposition. Carbon Nanotubes—Synthesis, Characterization, Applications. Jul. 20, 2011; 99-120.

Zhao et al., Influence of copper crystal surface on the CVD growth of large area monolayer graphene. Solid State Communications. Apr. 2011;151(7):509-13. Epub Jan. 23, 2011.

Zheng et al., Multiwall carbon nanotube/copper porous coating for heat transfer application. Surface Engineering. 2015;31(10):723-32. Epub Apr. 2, 2015.

Zhou et al., 3D self-assembly of aluminium nanoparticles for plasmon-enhanced solar desalination. Nature Photonics. 2016;10:393-8. Epub Apr. 25, 2016.

Zhou et al., Copper catalyzing growth of single-walled carbon nanotubes on substrates. Nano Lett. Dec. 2006;6(12):2987-90.

Zhu et al., Synthesis of bamboo-like carbon nanotubes on a copper foil by catalytic chemical vapor deposition from ethanol. Carbon. Jun. 2012;50(7):2504-12. Epub Feb. 6, 2012.

Zoican Loebick et al., Selective synthesis of subnanometer diameter semiconducting single-walled carbon nanotubes. J Am Chem Soc. Aug. 18, 2010;132(32):11125-31. doi: 10.1021/ja102011h.

Zou et al., Single Carbon Fibers with a Macroscopic-Thickness, 3D Highly Porous Carbon Nanotube Coating. Adv Mater. Mar. 2018;30(13):e1704419. doi: 10.1002/adma.201704419. Epub Feb. 19, 2018. 9 pages.

International Search Report for International Patent Application No. PCT/US2019/066279, mailed Apr. 24, 2020.

Written Opinion of the International Searching Authority for International Patent Application No. PCT/US2019/066279, mailed Apr. 24, 2020.

Yan et al., Toward the synthesis of wafer-scale single-crystal graphene on copper foils. ACS Nano. Oct. 23, 2012;6(10):9110-7. doi: 10.1021/nn303352k. Epub Sep. 19, 2012. Erratum in: ACS Nano. Jan. 22, 2013;7(1):875. Erratum in: ACS Nano. Mar. 26, 2013;7(3):2872.

\* cited by examiner

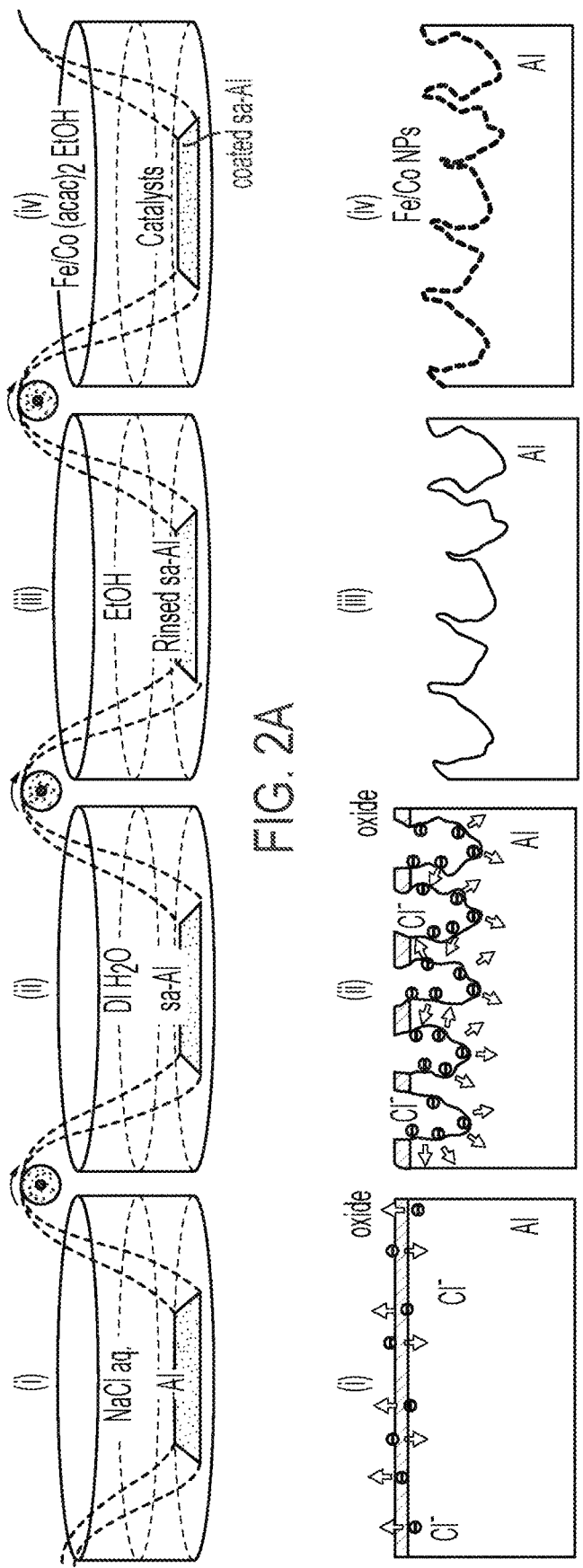
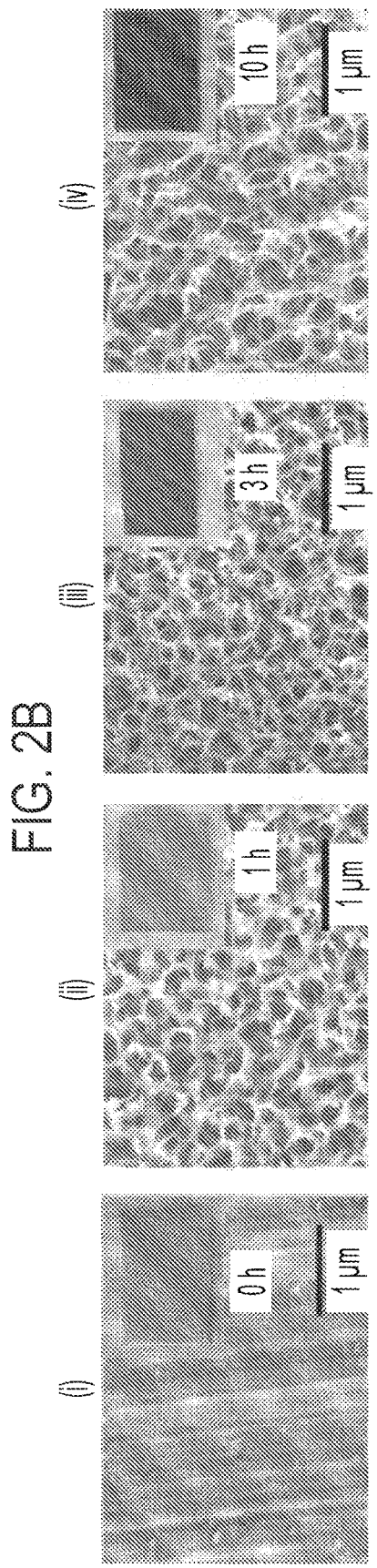
FIG. 2A
FIG. 2B
FIG. 2C

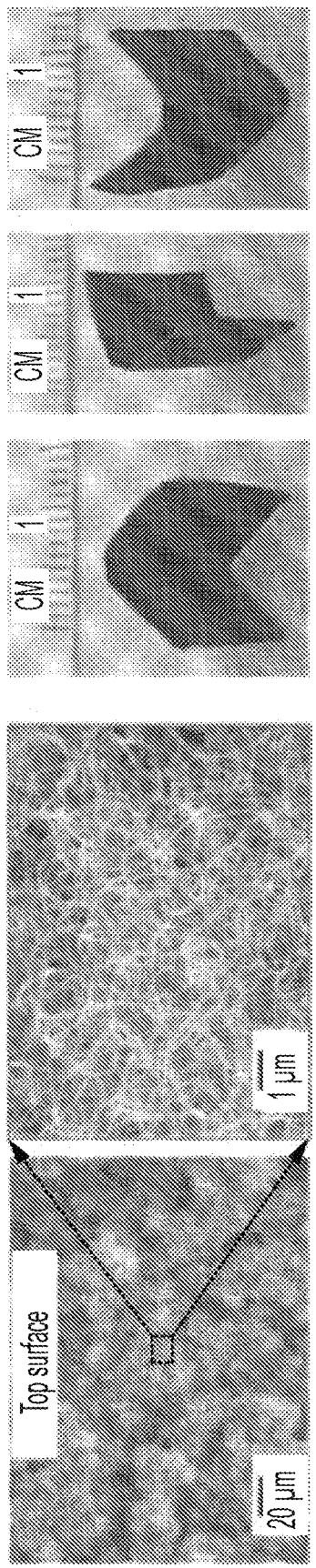
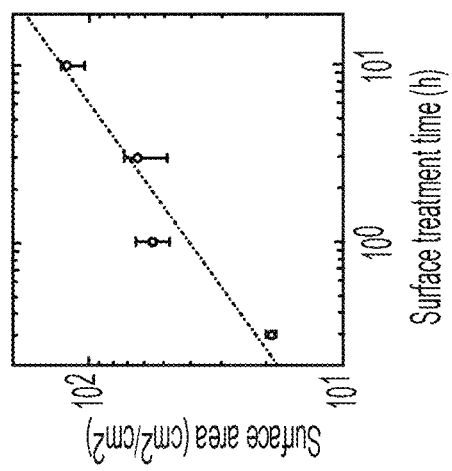
FIG. 3A  FIG. 3B  FIG. 3C  FIG. 3D

US 12,479,728 B2

FABRICATION OF CARBON-BASED NANOSTRUCTURES ON METALLIC SUBSTRATES, INCLUDING ALUMINUM-CONTAINING SUBSTRATES

RELATED APPLICATIONS

This application is a national stage filing under 35 U.S.C. § 371 of International Patent Application No. PCT/US2019/066279, filed Dec. 13, 2019, and entitled "Fabrication of Carbon-Based Nanostructures on Metallic Substrates, Including Aluminum-Containing Substrates," which claims priority under 35 U.S.C. § 119 (e) to U.S. Provisional Application No. 62/780,116, filed Dec. 14, 2018, and entitled "Fabrication of Carbon-Based Nanostructures on Metallic Substrates, Including Aluminum-Containing Substrates," each of which is incorporated herein by reference in its entirety for all purposes.

TECHNICAL FIELD

Fabrication of carbon-based nanostructures on metallic substrates, including aluminum-containing substrates, is generally described.

SUMMARY

Systems and methods for the fabrication of carbon-based nanostructures on metallic substrates, including aluminum-containing substrates, are generally described. Inventive articles comprising carbon-based nanostructures and metallic substrates are also described. In certain embodiments, after the formation of the carbon-based nanostructures, the carbon-based nanostructures are arranged over the metallic substrate such that an electronically conductive pathway is maintained from the substrate to the carbon-based nanostructures. This can be achieved, for example, by removing an oxide or other electronically insulating region from the metallic substrate before or during formation and/or growth of the carbon-based nano structures over the exposed metallic region.

Also described herein are articles that absorb a relatively large percentage of electromagnetic radiation over relatively broad ranges of wavelengths.

The subject matter of the present invention involves, in some cases, interrelated products, alternative solutions to a particular problem, and/or a plurality of different uses of one or more systems and/or articles.

In one aspect, an article is provided. The article comprises, according to some embodiments, a substrate comprising aluminum metal and/or aluminum alloy; catalyst comprising at least one metallic species arranged such that the at least one metallic species is in direct contact with metallic aluminum of the substrate; and elongated carbon-based nanostructures in direct contact with the catalyst.

In some embodiments, the article comprises a surface wherein a reflectance of the surface is $1\times10^{-3}$ or less over the UV range, and/or a reflectance of the surface is $6\times10^{-4}$ or less over the visible range, and/or a reflectance of the surface is $6\times10^{-4}$ or less over the near-infrared range, and/or a reflectance of the surface is $1\times10^{-3}$ or less over the mid-infrared range.

In another aspect, a method is disclosed. The method comprises, in certain embodiments, exposing a substrate comprising a metal and/or metal alloy region and a metal oxide region over the metal and/or metal alloy region to at least one agent such that at least a portion of the metal oxide region is removed from the substrate; depositing a catalyst or precursor thereof comprising at least one metal over the substrate such that the catalyst or precursor thereof is in direct contact with a metallic species of the substrate; and exposing the catalyst or precursor thereof to conditions causing the formation and/or growth of carbon-based nanostructures directly on the catalyst.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 2A is a process flow diagram for a solution-based surface activation (SA) process using an aluminum substrate, according to certain embodiments. The Al substrate is submerged into NaCl aq. solution with sonication for surface activation which removes oxide layer and creates a nano-structured surface (i). The surface-activated Al (sa-Al) substrate is then rinsed in DI water (ii) and ethanol (iii). The Fe/Co catalysts for CNT synthesis are deposited on the rinsed sa-Al substrate by dip-coating in Fe and Co acetate ethanol solution and dried in reactor under Ar flow (iv). The entire surface activation and catalyst deposition process can be deployed in a roll-to-roll fashion.

FIG. 2B is a series of schematics of the surface structural evolution of the Al substrate for the process illustrated in FIG. 2A. The surface activation is initiated by localized Cl⁻ attack (i). The oxide removal and nanostructure formation are realized by chloride accumulation and the associated fluctuations at the matrix/passive film interface (ii). After rinsing (iii), the sa-Al with superior wettability are coated with Fe/Co acetate ethanol thin film (iv).

FIG. 2C is a series of SEM images of the as-received Al substrate (i) and surface-activated Al substrates for different treatment duration, 1 h (ii), 3 h (iii), 10 h (iv). The inset photo shows the color change of the corresponding Al substrates, in accordance with certain embodiments.

FIG. 3A includes scanning electron microscope (SEM) images of a top surface of crystalline high-yield carbon nanotubes (CNTs) synthesized directly on a metallic sa-Al substrate, in accordance with some embodiments.

FIG. 3B includes scanning electron microscope (SEM) images of a cross-section of crystalline high-yield carbon nanotubes (CNTs) synthesized directly on a metallic sa-Al substrate, in accordance with some embodiments.

FIG. 3C includes photographs of a freeform CNT-Al structure synthesized in a 1-inch furnace, in accordance with certain embodiments.

FIG. 3D is a plot of areal surface area of CNTs on sa-Al with different surface activation treatment times, in accordance with certain embodiments.

DETAILED DESCRIPTION

Figure 1A:
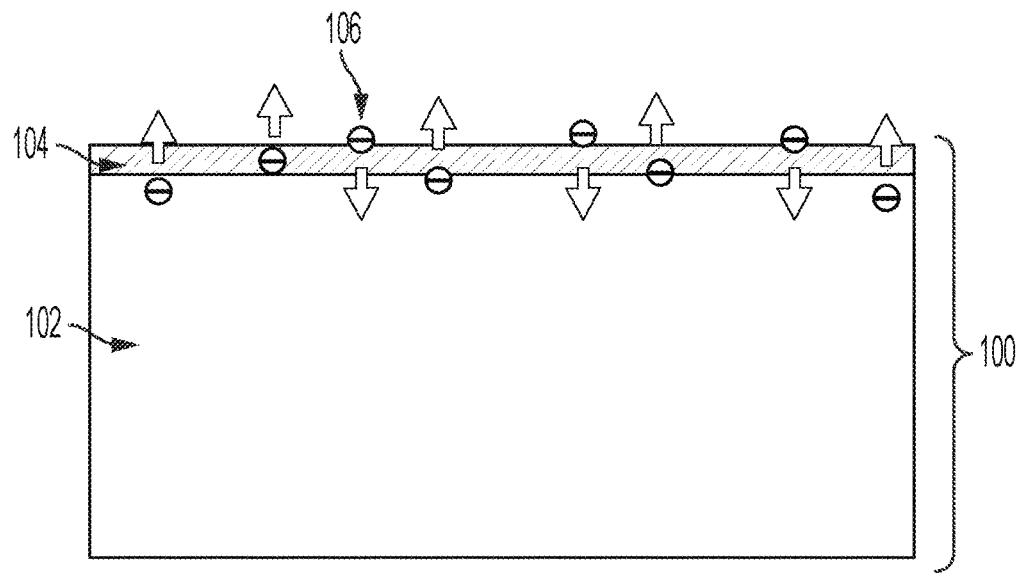
FIG. 1A is, in accordance with certain embodiments, a cross-sectional schematic illustration of an article comprising a substrate and an oxide region.

Certain aspects are related to methods of forming and/or growing carbon-based nanostructures. A non-limiting example of one such method is shown in FIGS. 1A-1F.

According to certain embodiments, the substrate comprises a metal and/or metal alloy region and a metal oxide region over the metal and/or metal alloy region. For example, in FIG. 1A, substrate 100 comprises metal and/or metal alloy region 102 and metal oxide region 104. In some embodiments, the metal and/or metal alloy region comprises aluminum, titanium, or mixtures thereof. For example, the metal and/or metal alloy region can be aluminum metal or an aluminum alloy. Non-limiting examples of aluminum alloys include alloys of aluminum with Si, Mn, Zn, Fe, Cu, or mixtures thereof. In some embodiments, aluminum makes up at least 50 at % (or at least 75 at %, at least 90 at %, or at least 95 at %, or at least 99 at %) of the elements in the alloy. As one non-limiting example, an aluminum alloy could be 0.6 wt % Si, 1.2 wt % Mn, 0.6 wt % Zn, 0.3 wt % Fe and 0.26 wt % Cu, with the balance of the alloy being aluminum.

In accordance with certain embodiments, the substrate comprises a metal foil, an alloy sheet, bulk metal, metal assembly elements, metal rivets, metal screws, metal bolts, or combinations thereof. In some embodiments, the substrate comprises fiber metal hybrid laminates ("FMHLs") comprising aluminum or titanium. For example, in some embodiments, the substrate comprises titanium graphite, glass reinforced aluminum ("GLARE"), and/or aramid reinforced aluminum laminate ("ARALL").

In certain embodiments, the oxide region is a native oxide region. That is to say, in some cases, the metal oxide region comprises a native oxide of a metal (or metals) of the metal and/or metal alloy region. As a non-limiting example, in some embodiments, region 102 is an aluminum substrate and oxide region 104 is aluminum oxide (e.g., $Al_2O_3$).

In accordance with certain embodiments, the substrate comprises metallic aluminum. As used herein, the term "metallic" refers to a material in which metal atoms are not chemically bound to a non-metal or a metalloid. As a non-limiting example, Co metal is a metallic species. On the other hand, the Co atoms in CoO are not a metallic species (because they are bound to oxygen, a non-metal). Similarly, Al metal is a metallic species, but the Al atoms in $Al_2O_3$ are not.

According to some embodiments, the method comprises exposing the substrate to at least one agent such that at least a portion of the metal oxide region is removed from the substrate. For example, in FIG. 1B, substrate 100 is exposed to agent 106, which results in removal of at least a portion of metal oxide region 104. In certain embodiments, exposing the substrate comprising the metal and/or metal alloy region and the metal oxide region over the metal and/or metal alloy region to the at least one agent such that at least a portion of the metal oxide region is removed from the substrate further comprises removing metal from the metal and/or metal alloy region to increase a surface roughness of the metal and/or metal alloy region. For example, in FIG. 1B, exposing substrate 100 to agent 106 results in removal of portions of metal oxide region 104 as well as removal of metal from the metal and/or metal alloy region 102. This leads to an increase in the roughness of top surface 107. It should be understood that the metal removal step is optional, and in other embodiments, only metal oxide removal (and no metal removal) occurs.

In accordance with certain embodiments, a single agent is used to remove at least a portion of the metal oxide region from the substrate and to remove metal from the metal and/or metal alloy region to increase the surface roughness of the metal and/or metal alloy region. For example, in FIG. 1B, a single agent is used to remove metal oxide material and metal material. For example, in some embodiments, agent 106 is a chloride-containing solution, such as NaCl. The chloride-containing solution can be used to remove at least a portion of the metal oxide region (e.g., aluminum oxide) from the substrate and also remove metal (e.g., aluminum) from the metal and/or metal alloy region to increase the surface roughness of the metal and/or metal alloy region.

Figure 1B:
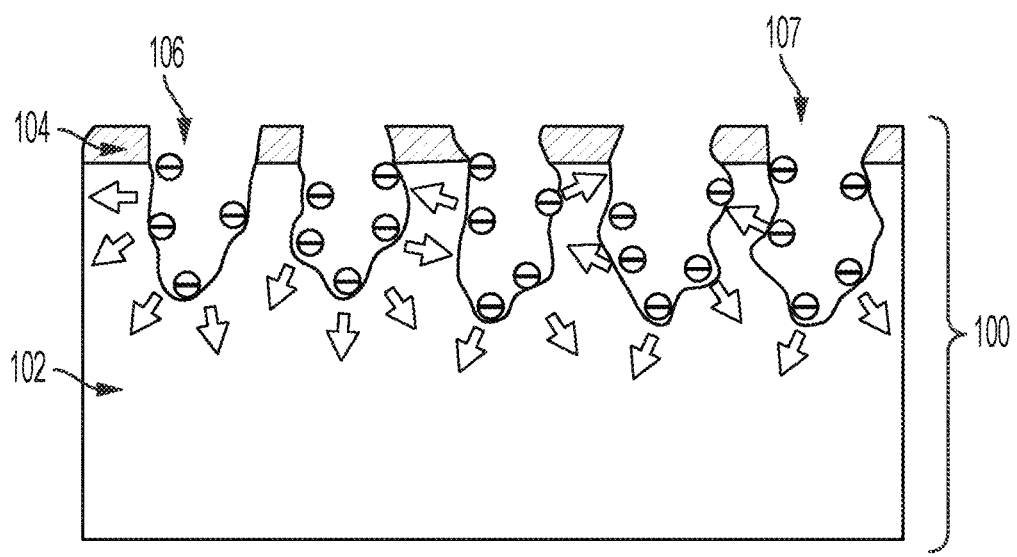
FIG. 1B is a cross-sectional schematic illustration of the article of FIG. 1A while being exposed to an agent, according to certain embodiments.

In other embodiments, a first agent is used to remove at least a portion of the metal oxide region from the substrate, and a second agent that is different from the first agent is used to remove metal from the metal and/or metal alloy region to increase the surface roughness of the metal and/or metal alloy region. As a non-limiting example, in some embodiments, the at least one agent 106 in FIG. 1B is two different agents. For example, in some embodiments, the first agent used to remove at least a portion of the metal oxide region from the substrate may be a chloride solution while the second agent used to remove metal from the metal and/or metal alloy region to increase the surface roughness of the metal and/or metal alloy region may be an acid.

In some embodiments, the at least one agent comprises chlorine atoms. According to certain embodiments, the at least one agent comprises a chloride-containing solution, a chloride-containing gas, and/or an acid. Examples of chloride-containing solutions include solutions comprising NaCl, HCl, KCl, or mixtures thereof, Examples of chloride-containing gases include gases comprising $Cl_2$, $SiCl_4$, $CCl_4$, or mixtures thereof. Examples of acids include phosphoric acid, acetic acid, nitric acid, or mixtures thereof. In a non-limiting embodiment, the at least one agent comprises NaCl dissolved in an aqueous solution.

In certain embodiments, the at least one agent comprises one or more liquids. For example, in some embodiments, the at least one agent is a solution, such as an aqueous solution.

In certain embodiments, there are additional steps that occur before, after, or concurrently with the exposing the substrate to the at least one agent. For example, sonication could be applied to the substrate before, after, or concurrently with the exposing the substrate to the at least one agent. In some embodiments, these additional steps may affect the removal of at least a portion of the metal oxide region from the substrate and/or may affect the removal of metal from the metal and/or metal alloy region to increase the surface roughness of the metal and/or metal alloy region. As a non-limiting example, in some embodiments, in FIG. 1B the at least one agent 106 comprises an NaCl aqueous solution, and exposing the substrate can comprise immersing the substrate 100 in the NaCl aqueous solution 106 with bath sonication.

Figure 1C:
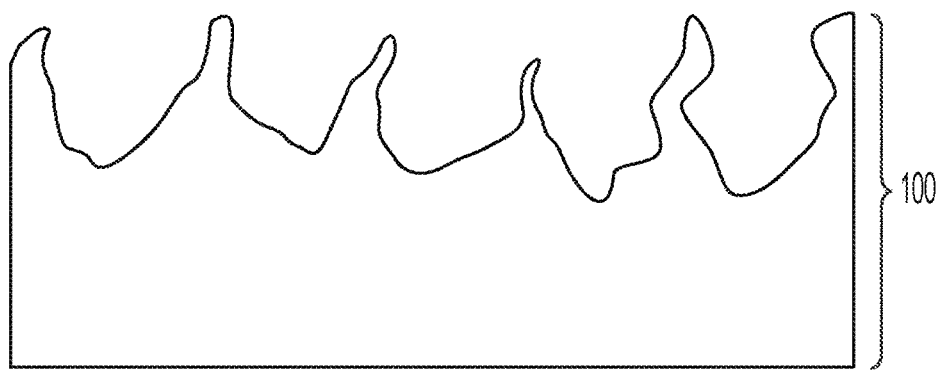
FIG. 1C is a cross-sectional schematic illustration of the article of FIGS. 1A and 1B after the article has been exposed to an agent, according to some embodiments.

In some embodiments, at least a portion (e.g., at least 10%, 25%, 50%, 75%, or more) of the metal oxide can be removed from the substrate. In some embodiments, the metal oxide can be completely (or substantially completely) removed from the substrate. For example, FIG. 1C is a cross-sectional schematic illustration of a substrate in which the metal oxide region 104 has been completely removed from substrate 100, leaving behind only metal and/or metal alloy portion 102. In other embodiments, at least some (e.g., at least 10%, 25%, 50%, 75%, or more) of the metal oxide portion may be left behind. In some embodiments, the metal oxide can be left behind in a pattern. For example, a mask may be used to selectively spatially expose the metal oxide material to form a patterned metal oxide material after exposure of the metal oxide material to the at least one agent.

Figure 1D:
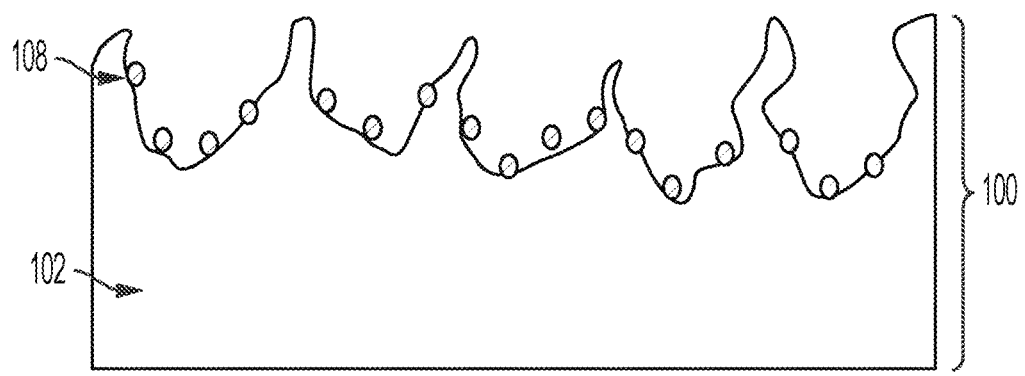
FIG. 1D is a cross-sectional schematic illustration of the article of FIG. 1C after a catalyst (or a precursor thereof) has been arranged over the substrate, according to certain embodiments.

In accordance with some embodiments, the method comprises depositing a catalyst or precursor thereof comprising at least one metal over the substrate. For example, in FIG. 1D, catalyst and/or catalyst precursor 108 (which comprises at least one metal in metallic or non-metallic form) is deposited over the substrate 100. As shown in FIG. 1D, the catalyst (and/or catalyst precursor) is in the form of a plurality of particles of catalyst (and/or catalyst precursor) material. In certain embodiments, the at least one metal comprises Fe, Co, Ni, Cu, Au, Al, or combinations thereof.

In some embodiments, the method comprises depositing the catalyst itself over the substrate. As one non-limiting example, the method can comprise FeCo catalyst on the substrate.

In certain embodiments, the method comprises depositing a catalyst precursor and subsequently modifying the precursor to form the catalyst. The catalyst precursor may be modified, for example, by changing the oxidation state of the catalyst precursor. An example of such modification is the chemical reduction of the precursor to form the catalyst. As one non-limiting embodiment, in some embodiments, the method comprises depositing FeO as a catalyst precursor. In certain embodiments, the FeO catalyst precursor is later chemically reduced to form Fe catalyst. In embodiments in which a catalyst precursor is modified to form the catalyst, the modification of the catalyst precursor can occur before and/or during the formation and/or growth of nanostructures.

In accordance with certain embodiments, the catalyst or catalyst precursor can be deposited by exposing the substrate to a solution containing the catalyst or catalyst precursor. As a non-limiting example, depositing a catalyst or precursor thereof comprising at least one metal over the substrate comprises immersing the substrate into a solution of 0.1 M iron (II) acetate and 0.1 M cobalt (II) acetate. Other deposition methods are also possible, such as vapor-based deposition, and the like.

In some embodiments, the process of depositing the catalyst or catalyst precursor occurs without forming an oxide over the metal and/or metal alloy region of the substrate. This can occur, for example, by depositing the catalyst or catalyst precursor without exposing the substrate to oxygen.

In certain embodiments, the catalyst or precursor thereof is in direct contact with a metallic species of the substrate. For example, in FIG. 1D, the substrate 100 comprises a metallic species 102, and the catalyst and/or catalyst precursor 108 is in direct contact with metallic species 102. That is to say, in some cases, there is no metal oxide region from the substrate in between the catalyst (or precursor thereof) 108 and the metallic species 102. In some embodiments, the metallic species of the substrate with which the catalyst (or precursor thereof) is in direct contact is part of a relatively large-scale region of the metallic species (and/or an alloy containing the metallic species).

In some embodiments, the catalyst precursor, when used, comprises at least one metallic species. In certain embodiments, the catalyst precursor does not initially include a metallic species but is later modified to include a metallic species. For example, in some embodiments, an FeO catalyst precursor is initially deposited and later chemically reduced to form an Fe metal catalyst.

In accordance with certain embodiments, the catalyst (e.g., as initially deposited and/or as formed after deposition) comprises at least one metallic species. As a non-limiting example, FeCo (which contains two metallic species—Fe and Co) could be deposited. Similarly, Fe (which contains one metallic species) could be deposited. (In contrast, depositing FeO would not constitute depositing a metallic species because the metal atom in this case—Fe—is chemically bound to a non-metal or a metalloid.)

In accordance with certain embodiments, there are additional steps that occur before, after, or concurrently with the depositing the catalyst and/or catalyst precursor over the substrate. For example, after the exposing the substrate to at least one agent and before the depositing the catalyst and/or catalyst precursor over the substrate, the substrate may be rinsed. In certain embodiments, the rinse may comprise a liquid or a gas (e.g., noble gases). For example, in certain embodiments, the rinse comprises water (e.g., deionized (DI) water), an alcohol (e.g., a $C_1$-$C_6$ alcohol, such as ethanol), or mixtures thereof.

According to certain embodiments, the method comprises exposing the catalyst or precursor thereof to conditions causing the formation and/or growth of carbon-based nanostructures directly on the catalyst. For example, in some embodiments, in FIG. 1E, the formation and/or growth of carbon-based nanostructures 110 is directly on the catalyst 108.

In some embodiments, the exposing the catalyst or precursor thereof to conditions causing the formation and/or growth of carbon-based nanostructures directly on the catalyst comprises forming and/or growing the carbon-based nanostructures at a temperature at or between 350° C. and 750° C. As a non-limiting example, in FIG. 1E, the catalyst or precursor thereof 108 is exposed to conditions causing the formation and/or growth of carbon-based nanostructures 110 directly on catalyst 108 at a low temperature. In certain embodiments, the low temperature is at or between 350° C. and 750° C., or at or between 400° C. and 600° C. In accordance with some embodiments, the conditions causing the formation and/or growth of carbon-based nanostructures directly on the catalyst comprise an oxygen dehydrogenation reaction. In certain embodiments, the conditions causing the formation and/or growth of carbon-based nanostructures directly on the catalyst comprise use of $H_2$ gas, Ar gas, $C_2H_2$, or mixtures thereof. According to some embodiments, the carbon-based nanostructures comprise carbon nanotubes, carbon nanowires, and/or carbon nanofibers.

In some embodiments, at least one metallic species of the catalyst is in direct contact with metallic aluminum of the substrate during at least a portion of the formation and/or growth of the carbon-based nanostructures. As a non-limiting example, in FIG. 1E, metallic portion 102 can be aluminum metal, and catalyst 108 comprises at least one metallic species that is in direct contact with the metallic aluminum of substrate 100 during at least a portion of the formation and/or growth of the carbon-based nanostructures 110. As another non-limiting example, in some embodiments, metallic portion 102 can be aluminum metal, catalyst 108 is FeCo and the catalyst is deposited directly over metallic aluminum 102 of the substrate, such that at least one metallic species of catalyst 108—Fe and/or Co—is in direct contact with the metallic aluminum of substrate 100 during at least a portion of the formation and/or growth of the carbon-based nanostructures 110. In another non-limiting example, an FeO catalyst precursor can be deposited on an exposed metallic surface of an aluminum substrate. In some such embodiments, the FeO is reduced to Fe metal before and/or during the formation and/or growth of the elongated carbon-based nanostructures such that a metallic species—Fe—is in direct contact with metallic aluminum of the substrate during at least a portion of the formation and/or growth of the carbon-based nanostructures.

In certain embodiments, there are additional steps that occur before, after, or concurrently with the exposing the catalyst or precursor thereof to conditions causing the formation and/or growth of carbon-based nanostructures. As a non-limiting example, in some embodiments, after depositing the catalyst over the substrate and before exposing the catalyst to conditions causing the formation and/or growth of carbon-based nanostructures, the substrate can be dried. In some embodiments, the substrate can be dried in an oxygen-free environment to avoid the formation of oxide.

An example of an oxygen-free environment includes an Argon environment. For example, in some embodiments, the substrate can be dried in a quartz tube with Argon flow. In certain embodiments, the substrate is not exposed to oxygen, such as the oxygen in air, after depositing the catalyst over the substrate up until and during the formation and/or growth of carbon-based nanostructures.

According to some embodiments, a support material can be added to the elongated carbon-based nanostructures. As a non-limiting example, in FIG. 1F, support material 130 has been added to elongated carbon-based nanostructures 110. Examples of support materials and uses thereof are included in more detail below.

Certain aspects are related to articles. The articles may, for example, result from any of the methods described above (or elsewhere herein).

Figure 1E:
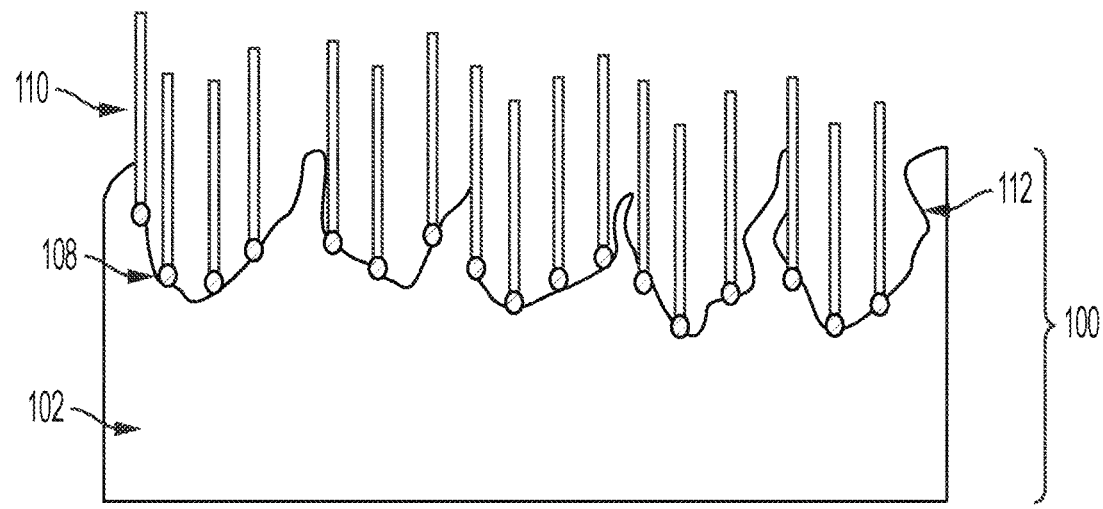
FIG. 1E is a cross-sectional schematic illustration of the article of FIG. 1D after elongated carbon-based nanostructures have been formed and grown using the catalyst, in accordance with certain embodiments.
Figure 1F:
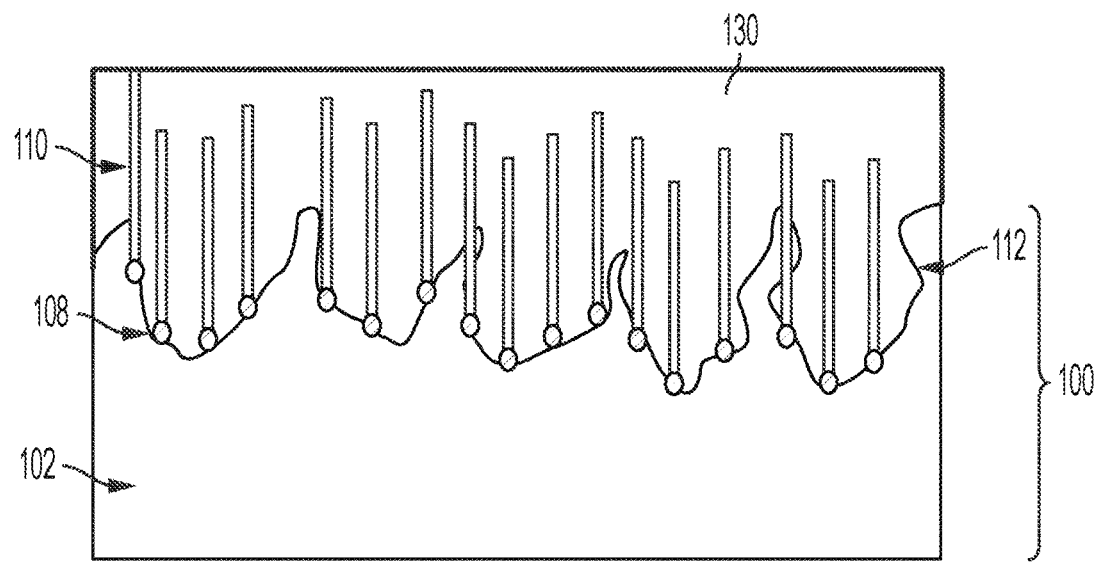
FIG. 1F is a cross-sectional schematic illustration of the article of FIG. 1E after a support material has been added to the elongated carbon-based nanostructures, according to some embodiments.

In certain embodiments, inventive articles comprise elongated carbon-based nanostructures. A non-limiting example of one such article is shown in FIG. 1E and FIG. 1F.

In accordance with certain embodiments, an article comprising a substrate comprising aluminum metal and/or aluminum alloy is provided. For example, in FIG. 1E, substrate 100 comprises region 102, which can be aluminum metal and/or aluminum alloy. In some embodiments, the substrate is an aluminum metal substrate or an aluminum alloy substrate. Non-limiting examples of aluminum alloys include mixtures of aluminum with Si, Mn, Zn, Fe, Cu, or mixtures thereof. For example, an aluminum alloy could be 0.6 wt % Si, 1.2 wt % Mn, 0.6 wt % Zn, 0.3 wt % Fe and 0.26 wt % Cu, with the balance being aluminum.

In accordance with certain embodiments, the substrate could be a metal foil, an alloy sheet, bulk metal, metal assembly elements, metal rivets, metal screws, metal bolts, or combinations thereof. In some embodiments, the substrate comprises fiber metal hybrid laminates ("FMHLs") comprising aluminum or titanium. For example, in some embodiments, the substrate comprises titanium graphite, glass reinforced aluminum ("GLARE"), and/or aramid reinforced aluminum laminate ("ARALL").

In certain embodiments, the substrate can include a metal and/or metal alloy region that has a relatively large scale. For example, in some embodiments, the substrate includes a metal and/or metal alloy region having at least one cross-sectional dimension of at least 1 mm, at least 5 mm, at least 1 cm, at least 10 cm, at least 1 m, or larger.

As one non-limiting embodiment, the substrate can comprise aluminum metal and/or aluminum alloy. In some embodiments, the aluminum metal and/or aluminum alloy of the substrate has at least one cross-sectional dimension of at least 1 mm, at least 5 mm, at least 1 cm, at least 10 cm, at least 1 m, or larger. As one example, in FIG. 1E, metal region 102 can be aluminum metal (or an aluminum alloy) and can have at least one cross-sectional dimension of at least 1 mm, at least 5 mm, at least 1 cm, at least 10 cm, at least 1 m, or larger.

In certain embodiments, the substrate can have various thicknesses. For example, the thickness of substrate can be 1 cm or less, 5 mm or less, 2 mm or less, 1 mm or less, 500 µm or less, 200 µm or less, 100 µm or less, 50 µm or less, 25 µm or less, or thinner. In some embodiments, the thickness of the substrate can be at least 10 µm, at least 100 µm, at least 1 mm, or thicker. Combinations of these ranges are also possible.

According to certain embodiments, the article comprises a catalyst comprising at least one metallic species. In some embodiments, the at least one metallic species comprises Fe, Co, Ni, Cu, Au, and/or Al. Referring back to FIG. 1E, catalyst 108 can comprise at least one metallic species. As a non-limiting example, catalyst 108 could be FeCo, which includes two metallic species—Fe and Co. Similarly, the catalyst 108 could be Fe, which includes a single metallic species.

In certain embodiments, the at least one metallic species of the catalyst comprises at least one non-aluminum metallic species. For example, in FIG. 1E, when catalyst 108 comprises FeCo it comprises at least two non-aluminum metallic species (because it contains for Fe and Co, neither of which are chemically bound to a non-metal or a metalloid). In contrast, if catalyst 108 is Al nanoparticles, the catalyst would not comprise at least one non-aluminum metallic species (because Al, while metallic, is not a non-aluminum species). Still further, neither FeO nor $Al_2O_3$ would comprise at least one non-aluminum metallic species, as neither contains any metallic species.

In accordance with some embodiments, the article comprises a catalyst comprising at least one metallic species arranged such that the at least one metallic species is in direct contact with metallic aluminum of the substrate. As a non-limiting example, in FIG. 1E, catalyst 108 can comprise at least one metallic species and the at least one metallic species can be in direct contact with metallic aluminum 102 of substrate 100. For example, in some embodiments, catalyst 108 is FeCo (which comprises at least two metallic species—Fe and Co), and it is arranged such that at least one of its metallic species is in direct contact with metallic aluminum 102 of substrate 100.

In some embodiments, the article comprises a catalyst comprising at least one metallic species arranged such that the at least one metallic species is in direct contact with metallic species within a relatively large-scale metal or metal alloy of the substrate. For example, in some embodiments, the catalyst comprises at least one metallic species arranged such that the metallic species is in direct contact with a metal and/or metal alloy region having at least one cross-sectional dimension of at least 1 mm, at least 5 mm, at least 1 cm, at least 10 cm, at least 1 m, or larger. In certain embodiments, the substrate comprises aluminum metal and/or aluminum alloy. In some such embodiments, the catalyst comprises at least one metallic species arranged such that the metallic species is in direct contact with metallic aluminum of the aluminum metal and/or aluminum alloy region, and the aluminum metal and/or aluminum alloy region of the substrate has at least one cross-sectional dimension of at least 1 mm, at least 5 mm, at least 1 cm, at least 10 cm, at least 1 m, or larger.

In certain embodiments, the catalyst is in contact with a surface portion of the substrate that has nanoscale surface roughness. For example, in FIG. 1E, catalyst 108 is in contact with surface portion 112 of substrate 100 that has nanoscale surface roughness. As a non-limiting example, nanoscale surface roughness could be formed from removal of an uneven native metal oxide layer on a metal surface by at least one agent, such as $H_2$ or NaCl solution. As another example, nanoscale surface roughness could be formed by removal of metal from a surface by at least one agent, such as NaCl solution or acid. An article is said to exhibit nanoscale surface roughness when its RMS surface roughness, as measured with a scanning electron microscope, is between 10 nm and 500 nm.

In accordance with some embodiments, the article comprises elongated carbon-based nanostructures in direct contact with the catalyst. For example, in FIG. 1E, elongated carbon-based nanostructures 110 are in direct contact with catalyst 108. The elongated carbon-based nanostructures can, in certain embodiments, be in direct contact with at least one metallic species of the catalyst.

According to certain embodiments, the article comprises a support material between and/or over the elongated carbon-based nanostructures. As a non-limiting example, in FIG. 1F, support material 130 is over elongated carbon-based nanostructures 110. Examples of support materials and uses thereof are described in more detail below. In some embodiments, the support material can enter the interstices between the elongated carbon-based nanostructures, for example, via capillary action. In some embodiments, the support material wets the elongated carbon-based nanostructures. In certain embodiments, the support material is added to the elongated carbon-based nanostructures as a liquid and is subsequently hardened (e.g., via solidification, polymerization and/or curing) to form a solid composite.

According to some embodiments, the article displays one or more beneficial properties that may have widespread applications.

Certain aspects are related to articles that reflect a very low amount of electromagnetic radiation across a relatively large range of wavelengths. Such surfaces of such articles can, in certain embodiments, be defined by a plurality of carbon-based nanostructures (e.g., a forest of elongated carbon-based nanostructures, such as carbon nanotubes).

In some embodiments, the reflectance of a surface of the article is $1 \times 10^{-3}$ or less (or $6 \times 10^{-4}$ or less; $4 \times 10^{-4}$ or less; $2 \times 10^{-4}$ or less; $1 \times 10^{-5}$ or less; $5 \times 10^{-5}$ or less; or $1 \times 10^{-5}$ or less) over the UV range (i.e., wavelengths of from 10 nm to 400 nm). In certain embodiments, the reflectance of a surface of the article is as little as $1 \times 10^{-5}$ or as little as $1 \times 10^{-6}$ over the UV range.

In some embodiments, the reflectance of a surface of the article is $6 \times 10^{-4}$ or less (or $4 \times 10^{-4}$ or less; $2 \times 10^{-4}$ or less; $1 \times 10^{-4}$ or less; $5 \times 10^{-5}$ or less; or $1 \times 10^{-5}$ or less) over the visible range (i.e., wavelengths from 400 nm to 750 nm). In certain embodiments, the reflectance of a surface of the article is as little as $1 \times 10^{-5}$ or as little as $1 \times 10^{-6}$ over the visible range.

In some embodiments, the reflectance of a surface of the article is $6 \times 10^{-4}$ or less (or $4 \times 10^{-4}$ or less; $2 \times 10^{-4}$ or less; $1 \times 10^{-4}$ or less; $5 \times 10^{-5}$ or less; or $1 \times 10^{-5}$ or less) over the near-infrared range (i.e., wavelengths from 750 nm to 3 micrometers). In certain embodiments, the reflectance of a surface of the article is as little as $1 \times 10^{-5}$ or as little as $1 \times 10^{-6}$ over the near-infrared range.

In some embodiments, the reflectance of a surface of the article is $1 \times 10^{-3}$ or less (or $6 \times 10^{-4}$ or less; $4 \times 10^{-4}$ or less; $2 \times 10^{-4}$ or less; $1 \times 10^{-4}$ or less; $5 \times 10^{-5}$ or less; or $1 \times 10^{-5}$ or less) over the mid-infrared range (i.e., wavelengths from 3 micrometers to 8 micrometers). In certain embodiments, the reflectance of a surface of the article is as little as $1 \times 10^{-5}$ or as little as $1 \times 10^{-6}$ over the mid-infrared range.

In some embodiments, the surface reflectance of the article is $10^{-5}$ or less over the UV, visible, near-infrared, and/or mid-infrared range. In certain embodiments, the surface reflectance of the article is $10^{-5}$ or less over the visible range.

The reflectance of a surface of an article can be measured using a UV-vis-NIR transmission/reflectance spectrophotometer using a reference aluminum coated mirror, or other references for calibration.

In certain embodiments, the article may have any of the above surface reflectance properties for all angles of incidence from 0° to 10°, for all angles of incidence from 0° to 30°, for all angles of incidence from 0° to 45°, for all angles of incidence from 0° to 60°, or for all angles of incidence from 0° to 75°. In some embodiments, the article may have any of the above surface reflectance properties for all angles of incidence from 0° to 90°. As would be understood by those of ordinary skill in the art, the angle of incidence for a given surface is measured relative to a line perpendicular to that surface, such that a 0° angle of incidence corresponds to radiation that is perpendicular to that surface. (See, e.g., FIG. 5G.)

In some embodiments, the surface of the article having low reflectance (e.g., any of the reflectance properties mentioned above or elsewhere herein) can be relatively large. For example, in some embodiments, the surface has an area of at least 1 mm$^2$, at least 1 cm$^2$, at least 10 cm$^2$, at least 100 cm$^2$, at least 225 cm$^2$, at least 1000 cm$^2$, at least 1 m$^2$, or more.

In accordance with some embodiments, the article shows omni-directional blackbody optical absorption.

According to some embodiments, certain of the articles disclosed herein and/or produced by the methods disclosed herein have high surface area, enhanced charge transfer, low optical and IR wavelength surface reflection, and/or decreased thermal and electrical interface resistance. Without wishing to be bound by any particular theory, it is believed that the absence of an oxide layer (or other electronically insulating layer) between the carbon-based nanostructure and the conductive substrate, in accordance with certain embodiments, contributes to faster electron transfer at the interfaces between the carbon-based nanostructure and the conductive substrate.

Moreover, in certain embodiments, the methods disclosed herein allow for fast growth of carbon-based nanostructures. In some embodiments, elongated carbon-based nanostructures can be grown at rates of at least 100 μm per hour, at least 500 μm per hour, at least 750 μm per hour, or at least 1000 μm per hour (or more) over a period of at least 10 minutes, at least 30 minutes, at least 60 minutes, or more. As one non-limiting example, a carbon nanotube forest with a thickness of 500 μm was achieved after a 30-min oxygen dehydrogenation reaction growth process.

Still further, without wishing to be bound by any particular theory, a bi-modal pore size distribution, in some embodiments, may facilitate rapid and/or complete adsorption/desorption of carbon precursors, and prevent an $H_3$ hysteresis loop.

The low temperature conditions of certain embodiments of the methods disclosed herein can facilitate the use of metals and metal alloys with low melting temperatures, such as aluminum and aluminum alloys. The ability to use the methods and articles disclosed herein with aluminum and aluminum alloys, in accordance with certain embodiments, is valuable at least because aluminum and aluminum alloys are lightweight, manufacturable, thermally and electrically conductive materials with the highest earth abundancy of any metal and extremely low production cost.

Moreover, the ability in certain embodiments for direct synthesis of carbon nanotubes on functional substrates at low temperature is promising to realize in-situ device integration having compatibility and scalability for industrial applications.

In some embodiments of the methods disclosed herein, the methods are solution-based processes, which facilitate the use of complex-shaped substrates as well as scaling for large-area industrial production. For example, in some embodiments, the methods disclosed herein can be deployed in a roll-to-roll fashion using solution baths.

In accordance with certain embodiments, the articles disclosed herein may be useful in applications including but not limited to sensing (e.g., near-infrared sensing), broadband electromagnetic absorption, energy harvesting and storage, solar cells, solar desalination, solar steam generation, flexible thermal/electrical interfaces/interconnects, lightweight and de-icing structural materials (e.g., for aerovehicles), and various space science applications, including but not limited to astronomy detectors, straylight absorbers, and starshades.

As used herein, the term "nanostructure" refers to an object having at least one cross-sectional dimension of less than 1 micron. In some embodiments, the nanostructure has at least one cross-sectional dimension of less than 500 nm, less than 250 nm, less than 100 nm, less than 75 nm, less than 50 nm, less than 25 nm, less than 10 nm, or, in some cases, less than 1 nm. Nanostructures described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

As used herein, the term "elongated nanostructure" refers to a structure having a maximum cross-sectional diameter of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. Those skilled in the art would understand that the aspect ratio of a given structure is measured along the longitudinal axis of the elongated nanostructure, and is expressed as the ratio of the length of the longitudinal axis of the nanostructure to the maximum cross-sectional diameter of the nanostructure. The "longitudinal axis" of an article corresponds to the imaginary line that connects the geometric centers of the cross-sections of the article as a pathway is traced, along the longest length of the article, from one end to another.

In some cases, the elongated nanostructure may have a maximum cross-sectional diameter of less than 1 micron, less than 100 nanometers, less than 50 nanometers, less than 25 nanometers, less than 10 nanometers, or, in some cases, less than 1 nanometer. A "maximum cross-sectional diameter" of an elongated nanostructure, as used herein, refers to the largest dimension between two points on opposed outer boundaries of the elongated nanostructure, as measured perpendicular to the length of the elongated nanostructure (e.g., the length of a carbon nanotube). The "average of the maximum cross-sectional diameters" of a plurality of structures refers to the number average.

The elongated nanostructure can have a cylindrical or pseudo-cylindrical shape, in some embodiments. In some embodiments, the elongated nanostructure can be a nanotube, such as a carbon nanotube. Other examples of elongated nanostructures include, but are not limited to, nanofibers and nanowires.

Elongated nanostructures can be single molecules (e.g., in the case of some nanotubes) or can include multiple molecules bound to each other (e.g., in the case of some nanofibers).

As used herein, the term "nanotube" refers to a substantially cylindrical elongated nanostructure comprising a fused network of primarily six-membered rings (e.g., six-membered aromatic rings). Nanotubes may include, in some embodiments, a fused network of at least 10, at least 100, at least 1000, at least $10^5$, at least $10^6$, at least $10^7$, or at least $10^8$ rings (e.g., six-membered rings such as six-membered aromatic rings), or more. In some cases, nanotubes may resemble a sheet of graphite formed into a seamless cylindrical structure. It should be understood that the nanotube may also comprise rings or lattice structures other than six-membered rings. According to certain embodiments, at least one end of the nanotube may be capped, i.e., with a curved or nonplanar aromatic group.

Elongated nanostructures may be formed of a variety of materials, in some embodiments. In certain embodiments, the elongated nanostructures comprise carbon (e.g., carbon-based nanostructures, described in more detail below). Other non-limiting examples of materials from which elongated nanostructures may be formed include silicon, indium-gallium-arsenide materials, boron nitride, silicon nitride (e.g., $Si_3N_4$), silicon carbide, dichalcogenides ($WS_2$), oxides (e.g., titanium dioxide, molybdenum trioxide), and boron-carbon-nitrogen compounds (e.g., $BC_2N_2$, $BC_4N$). In some embodiments, the elongated nanostructure may be formed of one or more inorganic materials. Non-limiting examples include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as ($WS_2$), oxides such as titanium dioxide ($TiO_2$) and molybdenum trioxide ($MoO_3$), and boron-carbon-nitrogen compositions such as $BC_2N_2$ and $BC_4N$.

As used herein, the term "carbon-based nanostructure" refers to articles having a fused network of aromatic rings, at least one cross-sectional dimension of less than 1 micron, and comprising at least 30% carbon by mass. In some embodiments, the carbon-based nanostructures may comprise at least 40%, at least 50%, at least 60%, at least 70%, at least 80%, at least 90%, or at least 95% of carbon by mass, or more. The term "fused network" would not include, for example, a biphenyl group, wherein two phenyl rings are joined by a single bond and are not fused. Examples of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like. In some embodiments, the carbon-based nanostructures comprise hollow carbon nanoshells and/or nanohorns.

In some embodiments, a carbon-based nanostructure may have at least one cross-sectional dimension of less than 500 nm, less than 250 nm, less than 100 nm, less than 75 nm, less than 50 nm, less than 25 nm, less than 10 nm, or, in some cases, less than 1 nm. Carbon-based nanostructures described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

According to certain embodiments, the carbon-based nanostructures are elongated carbon-based nanostructures. As used herein, the term "elongated carbon-based nanostructure" refers to a carbon-based nanostructure structure having a maximum cross-sectional diameter of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. As noted above, those skilled in the art would understand that the aspect ratio of a given structure is measured along the longitudinal axis of the elongated nanostructure, and is expressed as the ratio of the length of the longitudinal axis of the nanostructure to the maximum cross-sectional diameter of the nanostructure.

In some cases, the elongated carbon-based nanostructure may have a maximum cross-sectional diameter of less than 1 micron, less than 100 nanometers, less than 50 nanometers, less than 25 nanometers, less than 10 nanometers, or, in some cases, less than 1 nanometer. As noted above, the "maximum cross-sectional diameter" of an elongated nanostructure, as used herein, refers to the largest dimension between two points on opposed outer boundaries of the elongated nanostructure, as measured perpendicular to the length of the elongated nanostructure (e.g., the length of a carbon nanotube). As noted above, the "average of the maximum cross-sectional diameters" of a plurality of structures refers to the number average.

The elongated carbon-based nanostructure can have a cylindrical or pseudo-cylindrical shape, in some embodiments. In some embodiments, the elongated carbon-based nanostructure can be a carbon nanotube. Other examples of elongated carbon-based nanostructures include, but are not limited to, carbon nanofibers and carbon nanowires.

Elongated carbon-based nanostructures can be single molecules or can include multiple molecules bound to each other.

In some embodiments, the carbon-based nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. In some cases, carbon nanotubes may include a wall that comprises fine-grained $sp^2$ sheets. In certain embodiments, carbon nanotubes may have turbostratic walls. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, organic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube comprises a multi-walled or single-walled carbon nanotube with an inner diameter wider than is attainable from a traditional catalyst or other catalyst. In some cases, the carbon nanotube may have a diameter less than 1 micron, less than 500 nm, less than 250 nm, less than 100 nm, less than 50 nm, less than 25 nm, less than 10 nm, or, in some cases, less than 1 nm.

As noted above, certain embodiments are related to methods of growing carbon-based nanostructures. According to some embodiments, the method of growing carbon-based nanostructures comprises providing a catalyst and/or catalyst precursor and exposing a precursor of the carbon-based nanostructures to the catalyst and/or catalyst precursor. It should be understood that, where catalysts and their associated properties are described below and elsewhere herein, either or both of the catalyst itself and/or the catalyst precursor may have the properties described as being associated with the catalyst. In some embodiments, the catalyst and/or catalyst precursor has these properties upon being exposed to the carbon-based nanostructure precursor. In certain embodiments, the catalyst and/or catalyst precursor has these properties at the beginning of a heating step used to form the carbon-based nanostructures. In certain embodiments, the catalyst and/or catalyst precursor has these properties at at least one point in time during which the catalyst and/or catalyst precursor is in a chamber or other vessel within which the carbon-based nanostructures are grown.

It should be understood that the growth of carbon-based nanostructures can include the initial nucleation/formation of the carbon-based nanostructure and/or making an existing carbon-based nanostructure larger in size. In certain embodiments, the growth of the carbon-based nanostructures comprises nucleating or otherwise forming the carbon-based nanostructures from material that is not a carbon-based nanostructure. In some embodiments, two or more carbon-based nanostructures may nucleate or otherwise form from a material that is not a carbon-based nanostructure. The two or more carbon-based nanostructures may be the same type of carbon-based nanostructure, or may be different types of carbon-based nanostructures. In some embodiments, the growth of the carbon-based nanostructures comprises making an existing carbon-based nanostructure larger in size. The growth process can also include both of these steps, in some cases. In certain embodiments, multiple growth steps can be performed, for example, using a single catalyst to grow carbon-based nanostructures multiple times.

The precursor of the carbon-based nanostructures can be exposed to the catalyst and/or catalyst precursor in a number of ways. Generally, exposing the catalyst and/or catalyst precursor comprises combining the nanostructure precursor and the catalyst and/or catalyst precursor with each other such that they are in contact. According to certain embodiments, exposing the precursor of the carbon-based nanostructures to the catalyst and/or catalyst precursor comprises adding the precursor of the carbon-based nanostructures to the catalyst and/or catalyst precursor. In certain embodiments, exposing the precursor of the carbon-based nanostructures to the catalyst and/or catalyst precursor comprises adding the catalyst and/or catalyst precursor to the precursor of the carbon-based nanostructures. In still other embodiments, the precursor of the carbon-based nanostructures and the catalyst and/or catalyst precursor can be mixed simultaneously. Other methods of exposure are also possible. Exposing the precursor of the carbon-based nanostructures to a catalyst and/or catalyst precursor can occur, according to some embodiments, in a chamber or other volume. The volume in which the precursor of the carbon-based nanostructures is exposed to the catalyst and/or catalyst precursor may be fully enclosed, partially enclosed, or completely unenclosed.

As noted above, according to certain embodiments, the precursor of the carbon-based nanostructures can be exposed to the catalyst to grow the carbon-based nanostructures from the precursor.

According to certain embodiments, carbon from the precursor of the carbon-based nanostructures may be dissociated from the precursor. The dissociation of the carbon from the precursor can, according to certain embodiments, involve the breaking of at least one covalent bond. In other cases, the dissociation of the carbon from the precursor does not involve breaking a covalent bond. The carbon dissociated from the precursor may, according to certain embodiments, chemically react to grow the carbon-based nanostructures via the formation of new covalent bonds (e.g., new carbon-carbon covalent bonds). In the growth of carbon nanotubes, for example, the nanostructure precursor material may comprise carbon, such that carbon dissociates from the precursor molecule and may be incorporated into the growing carbon nanotube via the formation of new carbon-carbon covalent bonds.

As described in more detail elsewhere herein, a variety of materials can be used as the precursor of the carbon-based nanostructures and as the catalyst and/or catalyst precursor. According to certain embodiments, carbon-based nanostructures (e.g., carbon nanotubes) may be synthesized using $CO_2$ and acetylene as precursors of the carbon-based nanostructures.

In some embodiments, the method of growing carbon-based nanostructures comprises exposing the catalyst and/or catalyst precursor to a set of conditions that causes growth of carbon-based nanostructures on the catalyst. Growth of the carbon-based nanostructures may comprise, for example, heating the precursor of the carbon-based nanostructures, the catalyst, or both. Other examples of suitable conditions under which the carbon-based nanostructures may be grown are described in more detail below. In some embodiments, growing carbon-based nanostructures comprises performing chemical vapor deposition (CVD) of nanostructures on the catalyst. In some embodiments, the chemical vapor deposition process may comprise a plasma chemical vapor deposition process. Chemical vapor deposition is a process known to those of ordinary skill in the art, and is explained, for example, in Dresselhaus M S, Dresselhaus G., and Avouris, P. eds. "Carbon Nanotubes: Synthesis, Structure, Properties, and Applications" (2001) Springer, which is incorporated herein by reference in its entirety. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

According to some embodiments, the nanostructure precursor comprises carbon dioxide ($CO_2$). The carbon dioxide in the nanostructure precursor can be in any state of matter, including solid, liquid, and/or gas. In certain, although not necessarily all, embodiments, a gaseous carbon dioxide nanostructure precursor is used. The carbon dioxide can be in more than one of these forms, e.g., when the reaction conditions comprise a temperature and pressure when more than one phase of carbon dioxide is stable. In some embodiments, carbon dioxide is the only nanostructure precursor present. In other embodiments, carbon dioxide is one of two or more nanostructure precursors to which the catalyst is exposed. Without wishing to be bound by any particular theory, it has been observed that the use of carbon dioxide nanostructure precursors can aid in the growth of carbon-based nanostructures (e.g., carbon nanotubes) at relatively low temperatures, compared to the temperatures at which carbon-based nanostructures can be grown in the absence of the carbon dioxide but under otherwise essentially identical conditions.

According to some embodiments, the nanostructure precursor comprises at least one of a hydrocarbon and an alcohol. In certain embodiments, the nanostructure precursor may contain one or more hydrocarbons but no alcohols. In other embodiments, the nanostructure precursor may contain one or more alcohols but no hydrocarbons. In yet other embodiments, the nanostructure precursor may contain both one or more hydrocarbons and one or more alcohols. In some such embodiments, the hydrocarbon(s) and/or alcohol(s) are the only nanostructure precursors present. In other embodiments, the nanostructure precursor further comprises additional molecules. For example, in some embodiments, the nanostructure precursor comprises carbon dioxide in addition to a hydrocarbon and/or an alcohol. In one particular set of embodiments, the nanostructure precursor comprises at least one alkyne (e.g., acetylene) and carbon dioxide.

The term "hydrocarbon" is used herein to describe organic compounds consisting only of hydrogen and carbon. A hydrocarbon may be saturated or unsaturated (at one or more locations) and may have a linear, branched, monocyclic, or polycyclic structure. A hydrocarbon may be aliphatic or aromatic, and may contain one or more alkyl, alkene, and/or alkyne functional groups. In certain embodiments, the hydrocarbon is an alkane. In some embodiments, the hydrocarbon is an alkene. In certain embodiments, the hydrocarbon is an alkyne. In some embodiments, the hydrocarbon is a $C_1$-$C_{10}$ hydrocarbon, such as a $C_1$-$C_8$ hydrocarbon, a $C_1$-$C_6$ hydrocarbon, or a $C_1$-$C_4$ hydrocarbon. For example, in some embodiments, the hydrocarbon is a $C_1$-$C_{10}$ alkyne, a $C_1$-$C_8$ alkyne, a $C_1$-$C_6$ alkyne, or a $C_1$-$C_4$ alkyne. In some embodiments, the hydrocarbon is a $C_1$-$C_{10}$ alkane, a $C_1$-$C_8$ alkane, a $C_1$-$C_6$ alkane, or a $C_1$-$C_4$ alkane. In certain embodiments, the hydrocarbon is a $C_1$-$C_{10}$ alkene, a $C_1$-$C_8$ alkene, a $C_1$-$C_6$ alkene, or a $C_1$-$C_4$ alkene. The hydrocarbon may have any molecular weight. Non-limiting examples of suitable hydrocarbons include methane ($CH_4$), ethylene ($C_2H_4$), and acetylene ($C_2H_2$). In certain but not necessarily all embodiments, the hydrocarbon comprises acetylene.

As used herein, the term "alcohol" refers to a molecule with at least one hydroxyl (—OH) functional group. Non-limiting examples of alcohols include methanol, ethanol, (iso)propanol, and butanol. Alcohols may be saturated or unsaturated (at one or more locations) and may have a linear, branched, monocyclic, or polycyclic structure. Alcohols may be aliphatic or aromatic, and may contain one or more alkyl, alkene, and/or alkyne functional groups. In certain but not necessarily all embodiments, alcohols may comprise more than one —OH functional group. In some embodiments, the alcohol is a $C_1$-$C_{10}$ alcohol, such as a $C_1$-$C_8$ alcohol, a $C_1$-$C_6$ alcohol, or a $C_1$-$C_4$ alcohol.

In some embodiments, at least 50% of the nanostructure precursor is made up of a combination of hydrocarbons, alcohols, and carbon dioxide. In certain embodiments, at least 60%, at least 70%, at least 80%, at least 90%, at least 95%, at least 99%, or all of the nanostructure precursor is made up of a combination of hydrocarbons, alcohols, and carbon dioxide. In certain embodiments, at least 50%, at least 60%, at least 70%, at least 80%, at least 90%, at least 95%, at least 99%, or all of the nanostructure precursor is made up of a combination of hydrocarbons and carbon dioxide. In certain embodiments, at least 60%, at least 70%, at least 80%, at least 90%, at least 95%, at least 99%, or all of the nanostructure precursor is made up of a combination of alkynes (e.g., $C_1$-$C_{10}$, $C_1$-$C_8$, $C_1$-$C_6$, or $C_1$-$C_4$ alkynes) and carbon dioxide. In certain embodiments, at least 60%, at least 70%, at least 80%, at least 90%, at least 95%, at least 99%, or all of the nanostructure precursor is made up of a combination of acetylene and carbon dioxide. Other ranges are also possible.

As noted above, the nanostructure precursor material can be in any suitable phase. In one set of embodiments, the nanostructure precursor material comprises a solid. Examples of solid nanostructure precursor materials include, for example, coal, coke, amorphous carbon, unpyrolyzed organic polymers (e.g., phenol-formaldehyde, resorcinol-formaldehyde, melamine-formaldehyde, etc.), partially pyrolyzed organic polymers, diamond, graphene, graphite, or any other suitable solid form of carbon. In some embodiments, the solid nanostructure precursor material may contain carbon in an amount of at least 25 wt %, at least 50 wt %, at least 75 wt %, at least 85 wt %, at least 90 wt %, at least 95 wt %, at least 98 wt %, or at least 99 wt %.

In one set of embodiments, the nanostructure precursor material comprises both a solid and a non-solid (e.g., a liquid, a gas, etc.). For example, the nanostructure precursor material can comprise a solid form of carbon placed close to or in contact with the catalyst and a vapor-phase nanostructure precursor material. As a specific example, the solid nanostructure precursor component can be deposited on or near the catalyst as soot, amorphous carbon, graphene, or graphite, and the catalyst can be exposed to vapor comprising a hydrocarbon (e.g., methane, ethylene, acetylene, and the like). Not wishing to be bound by any particular theory, under some growth conditions, the presence of the solid nanostructure precursor material can allow for nanostructure growth that might not occur in the absence of the solid nanostructure precursor material. In some cases, the solid precursor material might provide a base from which the non-solid nanostructure precursor material can be added to grow the carbon-based nanostructure. For example, in some embodiments, a small portion of a carbon nanotube can be used as a starting material from which a larger nanotube can be grown using non-solid carbon nanostructure precursor material.

As noted above, certain embodiments comprise exposing the nanostructure precursor and the catalyst and/or catalyst precursor to a set of conditions that causes growth of carbon-based nanostructures on the catalyst. In some cases, the set of conditions may facilitate nucleation of carbon-based nanostructures during the growth process. According to certain embodiments, carbon-based nanostructures can be grown at relatively low temperatures. The ability to grow carbon-based nanostructures at relatively low temperatures can be advantageous, according to certain but not necessarily all embodiments, as the use of low temperatures can reduce the amount of energy needed to perform the growth process. According to some embodiments, the catalyst is at a temperature of less than or equal to 750° C., less than or equal to 700° C., less than or equal to 650° C., less than or equal to 600° C., less than or equal to 500° C., less than or equal to 450° C., less than or equal to 425° C., less than or equal to 400° C., less than or equal to 350° C., less than or equal to 300° C., less than or equal to 250° C., less than or equal to 200° C., less than or equal to 150° C., or less than or equal to 100° C. during the growth of the carbon-based nanostructures. The temperature of the catalyst during the growth of the carbon-based nanostructures may be greater than or equal to 50° C., greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 425° C., greater than or equal to 450° C., greater than or equal to 500° C., greater than or equal to 600° C., greater than or equal to 700° C., greater than or equal to 800° C., greater than or equal to 900° C., greater than or equal to 1000° C., or greater than or equal to 1100° C., according to certain embodiments. Combinations of the above referenced ranges are also possible (for example, greater than or equal to 100° C. and less than or equal to 500° C., greater than or equal to 100° C. and less than or equal to 1200° C., or greater than or equal to 350° C. and less than or equal to 720° C.). Other ranges are also possible.

In some embodiments, the precursor of the carbon-based nanostructures is at a temperature of less than or equal to 1200° C., less than or equal to 1100° C., less than or equal to 1000° C., less than or equal to 900° C., less than or equal to 800° C., less than or equal to 720° C., less than or equal to 700° C., less than or equal to 600° C., less than or equal to 500° C., less than or equal to 450° C., less than or equal to 425° C., less than or equal to 400° C., less than or equal to 350° C., less than or equal to 300° C., less than or equal to 250° C., less than or equal to 200° C., less than or equal to 150° C., or less than or equal to 100° C. during the growth of the carbon-based nanostructures. The temperature of the precursor of the carbon-based nanostructures during the growth of the carbon-based nanostructures may be greater than or equal to 50° C., greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 425° C., greater than or equal to 450° C., greater than or equal to 500° C., greater than or equal to 600° C., greater than or equal to 700° C., greater than or equal to 800° C., greater than or equal to 900° C., greater than or equal to 1000° C., or greater than or equal to 1100° C., according to certain embodiments. Combinations of the above referenced ranges are also possible (for example, greater than or equal to 100° C. and less than or equal to 500° C., greater than or equal to 100° C. and less than or equal to 1200° C., or greater than or equal to 350° C. and less than or equal to 720° C.). Other ranges are also possible. In some embodiments, the precursor of the carbon-based nanostructures is at a temperature outside the ranges listed above during the growth of the carbon-based nanostructures.

In certain embodiments, the substrate (when present) is at a temperature of less than or equal to 1200° C., less than or equal to 1100° C., less than or equal to 1000° C., less than or equal to 900° C., less than or equal to 800° C., less than or equal to 720° C., less than or equal to 700° C., less than or equal to 600° C., less than or equal to 500° C., less than or equal to 450° C., less than or equal to 425° C., less than or equal to 400° C., less than or equal to 350° C., less than or equal to 300° C., less than or equal to 250° C., less than or equal to 200° C., less than or equal to 150° C., or less than or equal to 100° C. during the growth of the carbon-based nanostructures. The temperature of the substrate (when present) during the growth of the carbon-based nanostructures may be greater than or equal to 50° C., greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 425° C., greater than or equal to 500° C., greater than or equal to 600° C., greater than or equal to 700° C., greater than or equal to 800° C., greater than or equal to 900° C., greater than or equal to 1000° C., or greater than or equal to 1100° C., according to certain embodiments. Combinations of the above referenced ranges are also possible (for example, greater than or equal to 100° C. and less than or equal to 500° C., greater than or equal to 100° C. and less than or equal to 1200° C., or greater than or equal to 350° C. and less than or equal to 720° C.). Other ranges are also possible.

According to certain embodiments, carbon-based nanostructure growth can occur within a vessel within which the temperature of the enclosed space is less than or equal to 1200° C., less than or equal to 1100° C., less than or equal to 1000° C., less than or equal to 900° C., less than or equal to 800° C., less than or equal to 720° C., less than or equal to 700° C., less than or equal to 600° C., less than or equal to 500° C., less than or equal to 450° C., less than or equal to 425° C., less than or equal to 400° C., less than or equal to 350° C., less than or equal to 300° C., less than or equal to 250° C., less than or equal to 200° C., less than or equal to 150° C., or less than or equal to 100° C. during the growth of the carbon-based nanostructures. The temperature of the enclosed space during the growth of the carbon-based nanostructures may be greater than or equal to 50° C., greater than or equal to 100° C., greater than or equal to 150° C., greater than or equal to 200° C., greater than or equal to 250° C., greater than or equal to 300° C., greater than or equal to 350° C., greater than or equal to 400° C., greater than or equal to 425° C., greater than or equal to 450° C., greater than or equal to 500° C., greater than or equal to 600° C., greater than or equal to 700° C., greater than or equal to 800° C., greater than or equal to 900° C., greater than or equal to 1000° C., or greater than or equal to 1100° C., according to certain embodiments. Combinations of the above referenced ranges are also possible (for example, greater than or equal to 100° C. and less than or equal to 500° C., greater than or equal to 100° C. and less than or equal to 1200° C., or greater than or equal to 350° C. and less than or equal to 720° C.). Other ranges are also possible.

In certain embodiments, two or more of the catalyst, the substrate, the nanostructure precursor, and the vessel (when present) are at the same temperature. According to some embodiments, none of the catalyst, substrate, nanostructure precursor, and vessel are at the same temperature. The temperature of any one or more components is higher or lower before and/or after growth for any period of time, in some embodiments.

In some cases, a source of external energy may be coupled with the growth apparatus to provide energy to cause the growth sites to reach the necessary temperature for growth. The source of external energy may provide thermal energy, for example, by resistively heating a wire coil in proximity to the growth sites (e.g., catalyst) or by passing a current through a conductive growth substrate. In some cases, the source of external energy may provide an electric and/or magnetic field to the substrate. In some cases, the source of external energy may be provided via magnetron heating, via laser, or via direct, resistive heating of the growth substrate, or a combination of one or more of these. The source of external energy may be provided as a component of a closed loop temperature control system in some embodiments. It may be provided as part of an open loop temperature control system in some embodiments. In an illustrative embodiment, the set of conditions may comprise the temperature of the catalyst surface, the chemical composition of the atmosphere surrounding the catalyst, the flow and pressure of reactant gas(es) (e.g., nanostructure precursors) surrounding the catalyst surface and within the surrounding atmosphere, the deposition or removal of catalysts or catalyst precursors, or other materials, on the surface of the substrate (when present), and/or optionally the rate of motion of the substrate. In some cases, the source of external energy may provide X-rays to the growth substrate (when present) and/or catalyst. Not wishing to be bound by any particular theory, the X-rays might induce oxygen deficiency into the catalyst, might activate the catalyst, and/or it might change the gas species coming into contact with the catalyst.

According to certain embodiments, exposure of the precursor of the carbon-based nanostructures to the catalyst may occur at a particular temperature, pH, solvent, chemical reagent, type of atmosphere (e.g., nitrogen, argon, oxygen, etc.), electromagnetic radiation, or the like. In some cases, the set of conditions under which the precursor of the carbon-based nanostructures is exposed to the catalyst may be selected to facilitate nucleation, growth, stabilization, removal, and/or other processing of nanostructures. In some cases, the set of conditions may be selected to facilitate reactivation, removal, and/or replacement of the catalyst. In some cases, the set of conditions may be selected to maintain the activity of the catalyst. Some embodiments may comprise a set of conditions comprising exposure to a source of external energy. The source of energy may comprise electromagnetic radiation, electrical energy, sound energy, thermal energy, or chemical energy. For example, the set of conditions could comprise exposure to heat or electromagnetic radiation, resistive heating, exposure to a laser, or exposure to infrared light. In some embodiments, the set of conditions comprises exposure to a particular temperature, pressure, chemical species, and/or nanostructure precursor material.

According to certain embodiments, the growth of the carbon-based nanostructures from the nanostructure precursors can occur under conditions which are selected such that carbon nanotubes are selectively produced. In many cases, conditions (e.g., temperature, pressure, etc.) that lead to the production of other carbon-based nanostructures, such as graphene, cannot be successfully used to produce nanotubes. In some cases, carbon nanotubes will not grow on traditional catalysts from which graphene will grow.

The growth of the carbon-based nanostructures can occur, in accordance with certain embodiments, under a gaseous atmosphere. The atmosphere can comprise the precursor and, optionally, one or more carrier gases which are not consumed during carbon-based nanostructure growth. Examples of suitable carrier gases include, but are not limited to, helium, argon, and nitrogen.

In certain embodiments in which carbon dioxide and at least one hydrocarbon (e.g., at least one alkyne) are used in the precursor of the carbon-based nanostructures, the molar ratio of carbon dioxide to the hydrocarbons (e.g., alkynes) is at least 0:1, at least 0.01:1, at least 0.05:1, at least 0.1:1; at least 0.2:1, at least 0.5:1, at least 1:1, or at least 2:1 (and/or, in certain embodiments, up to 0.01:1, up to 0.05:1, up to 0.1:1, up to 0.2:1, up to 0.5:1, up to 1:1, up to 2:1, up to 10:1, up to 13:1, up to 15:1, up to 20:1, up to 100:1, or more). For example, in some embodiments in which carbon dioxide and acetylene ($C_2H_2$) are used in the precursor of the carbon-based nanostructures, the molar ratio of carbon dioxide to acetylene is at least 0.01:1, at least 0.05:1, at least 0.1:1; at least 0.2:1, at least 0.5:1, at least 1:1, or at least 2:1 (and/or, in certain embodiments, up to 10:1, up to 13:1, up to 15:1, up to 20:1, up to 100:1, or more).

Introduction of gases to a gaseous atmosphere can occur at any suitable rate. In some embodiments, any gas present during the reaction may be introduced to the gaseous atmosphere at a rate greater than or equal to 0.01 sccm, greater than or equal to 0.1 sccm, greater than or equal to 1 sccm, greater than or equal to 5 sccm, greater than or equal to 10 sccm, greater than or equal to 25 sccm, greater than or equal to 50 sccm, greater than or equal to 100 sccm, greater than or equal to 150 sccm, greater than or equal to 500 sccm, or greater than or equal to 1000 sccm. Any gas present during the reaction may be introduced to the gaseous atmosphere at a rate less than or equal to 1500 sccm, less than or equal to 1000 sccm, less than or equal to 500 sccm, less than or equal to 150 sccm, less than or equal to 100 sccm, less than or equal to 50 sccm, less than or equal to 25 sccm, less than or equal to 10 sccm, less than or equal to 5 sccm, less than or equal to 1 sccm, or less than or equal to 0.1 sccm. Combinations of the above-referenced ranges are also possible (e.g., greater than or equal to 10 sccm and less than or equal to 25 sccm). Other ranges are also possible. If more than one gas is introduced, the gases may be introduced at the same rate or they may be introduced at different rates. Gases may be introduced at the same time or at different times. The gases may be introduced in any order (e.g., the nanostructure precursor may be introduced prior to the introduction of any other gas, may be introduced after all other gases have been introduced, or may be introduced before some gases but after others).

In some cases, exposure occurs at pressures comprising substantially atmospheric pressure (i.e., about 1 atm or 760 torr). In some cases, exposure occurs at a pressure of less than 1 atm (e.g., less than 100 torr, less than 10 torr, less than 1 torr, less than 0.1 ton, less than 0.01 torr, or lower). In some cases, the use of high pressure may be advantageous. For example, in some embodiments, exposure to a set of conditions comprises exposure at a pressure of at least 2 atm, at least 5 atm, at least 10 atm, at least 25 atm, or at least 50 atm.

The carbon-based nanostructures may grow from the nanostructure precursor at any suitable rate. In some embodiments, the carbon-based nanostructures may grow from the nanostructure precursor such that lengths of carbon-based nanostructures increase at a rate of greater than or equal to 0.1 microns per minute, greater than or equal to 0.25 microns per minute, greater than or equal to 0.5 microns per minute, greater than or equal to 1 micron per minute, greater than or equal to 2.5 microns per minute, or greater than or equal to 5 microns per minute. In some embodiments, the carbon-based nanostructures may grow from the nanostructure precursor such that lengths of carbon-based nanostructures increase at a rate of up to 10 microns per minute, up to 50 microns per minute, up to 100 microns per minute, or more. Combinations of the above-referenced ranges are also possible (e.g., greater than or equal to 0.1 microns per minute and up to 100 microns per minute). Other ranges are also possible.

The carbon-based nanostructures may grow from the nanostructure precursors for any amount of time. In certain embodiments, the growth may occur over a time period of greater than or equal to 1 minute, greater than or equal to 2 minutes, greater than or equal to 5 minutes, greater than or equal to 10 minutes, greater than or equal to 15 minutes, greater than or equal to 30 minutes, or greater than or equal to 60 minutes. The growth may occur over a period of less than or equal to 90 minutes, less than or equal to 60 minutes, less than or equal to 30 minutes, less than or equal to 15 minutes, less than or equal to 10 minutes, less than or equal to 5 minutes, or less than or equal to 2 minutes. Combinations of the above-referenced ranges are also possible (e.g., greater than or equal to 5 minutes and less than or equal to 15 minutes). Other ranges are also possible.

Generally, materials which are in direct contact with each other are directly adjacent to each other with no intervening material.

First and second articles that are in indirect contact with each other have one or more intermediate materials between them, and a pathway can be drawn from the first article to the second article which pathway does not traverse a gas.

First and second articles that are in indirect solid contact with each other have one or more intermediate solid materials between them, and a pathway can be drawn from the first article to the second article which pathway travels only through solid material(s).

In certain embodiments, the catalyst, or a precursor thereof, is supported by a substrate. The substrate can be a single material or it may be a composite substrate that includes more than one component. A variety of growth substrates may be used in accordance with certain of the systems and methods described herein. Growth substrates may comprise any material capable of supporting the catalyst, or a precursor thereof, and/or the carbon-based nanostructures that are grown. The growth substrate may be selected to be inert to and/or stable under sets of conditions used in a particular process, such as nanostructure growth conditions, nanostructure removal conditions, and the like. In some cases, the growth substrate comprises a substantially flat surface. In some cases, the growth substrate comprises a substantially nonplanar surface. For example, the growth substrate may comprise a cylindrical surface.

In some embodiments, the substrate may be a solid. According to certain embodiments, the solid may be a single phase material such as a metal. The solid may be a composite, in some embodiments. In certain embodiments, the solid may be in any state of crystallinity including single crystalline, polycrystalline, semicrystalline, and/or amorphous.

According to certain embodiments, the substrate (or a component of a composite substrate) can be sensitive to elevated temperatures. For example, in some embodiments, the substrate (or a component of a composite substrate) can undergo a phase change or a substantial loss of mass when heated to relatively low temperatures. One advantage of certain (although not necessarily all) embodiments is that carbon-based nanostructures can be grown at relatively low temperatures, which can allow for the growth of carbon-based nanostructures on substrates that were believed to be too temperature-sensitive to support carbon-based nanostructure growth without changing phase or degrading.

As used herein, the metal elements are those found in Groups 1-12 of the Periodic Table (except hydrogen (H)); Al, Ga, In, Tl, and Nh in Group 13 of the Periodic Table; Sn, Pb, and Fl in Group 14 of the Periodic Table; Bi and Mc in Group 15 of the Periodic Table; Po and Lv in Group 16 of the Periodic Table; the lanthanides; and the actinides.

As used herein, the metalloid elements are boron (B), silicon (Si), germanium (Ge), arsenic (As), antimony (Sb), tellurium (Te), and Astatine (At).

As used herein, the non-metal elements are hydrogen (H), carbon (C), nitrogen (N), phosphorous (P), oxygen (O), sulfur (S), selenium (Se), fluorine (F), chlorine (Cl), bromine (Br), iodine (I), helium (He), neon (Ne), argon (Ar), krypton (Kr), xenon (Xe), radon (Rn), and oganesson (Og).

As noted above, certain embodiments comprise use or addition of one or more support materials. The support materials may provide mechanical, chemical, or otherwise stabilizing support for the plurality of nanostructures. In some cases, the support material may be a monomer, a polymer, a fiber, a ceramic, or a metal, and may be further processed to support the nanostructures. For example, a mixture of monomeric species may be added to the elongated nanostructures, and subsequent polymerization of the monomeric species may produce a polymer matrix comprising the elongated nanostructures disposed therein. As another example, a solgel can be applied to a collection of elongated nanostructures and processed to form a ceramic material between the elongated nanostructures. In some embodiments, gas phase infiltration can be used to form carbonaceous material or silicon carbide between the elongated nanostructures. Gas-phase infiltration may be executed by various processes such as chemical vapor deposition including decomposition of hydrocarbons. Examples of suitable support materials are described in detail below.

The support material may be a polymer material (e.g., an organic polymer material), a metal material, a ceramic material, or combinations thereof. Polymer materials for use as binding materials and/or support materials, as described herein, may be any material compatible with elongated nanostructures. For example, the polymer material may be selected to uniformly "wet" the elongated nanostructures and/or to bind one or more substrates. In some cases, the polymer material may be selected to have a particular viscosity, such as 50,000 cPs or lower; 10,000 cPs or lower; 5,000 cPs or lower; 1,000 cPs or lower; 500 cPs or lower; 250 cPs or lower; or 100 cPs or lower. In some embodiments, the polymer material may be selected to have a viscosity between 150-250 cPs. In some cases, the support material may comprise a thermoset or thermoplastic. Non-limiting examples of thermosets include Microchem SU-8 (UV curing epoxy, grades from 2000.1 to 2100, and viscosities ranging from 3 cPs to 10,000 cPs), Buehler Epothin (low viscosity, about 150 cPs, room temperature curing epoxy), West Systems 206+109 Hardener (low viscosity, ~200 cPs, room temperature curing epoxy), Loctite Hysol 1C (20-min curing conductive epoxy, viscosity 200,000-500,000 cPs), Hexcel RTM6 (resin transfer molding epoxy, viscosity during process ~10 cPs), Hexcel HexFlow VRM 34 (structural VARTM or vacuum assisted resin transfer molding epoxy, viscosity during process ~500 cPs). Non-limiting examples of thermoplastics include polystyrene, or Microchem PMMA (UV curing thermoplastic, grades ranging from 10 cPs to ~1,000 cPs). In one embodiment, the polymer support material may be PMMA, EpoThin, West-Systems EPON, M21 resin, Cycom 5320, 8552 resin, RTM6, VRM34, 977-3, SU8, or Hysol1C.

The support material (or a precursor thereof) may be transported between the elongated nanostructures via any method known to those of ordinary skill in the art. In some embodiments, the support material may be transported between the elongated nanostructures via capillary forces. In other embodiments, the support material or precursor thereof may be transported between the elongated nanostructures by pressure driven flow, molding, or any other known technique.

The support material may be hardened using any suitable method. In some embodiments in which epoxy is used as a support material, the epoxy may be cured, for example, by allowing the precursor material to set, or optionally by applying heat. In some embodiments, hardening may comprise the polymerization of the support material precursor. In some embodiments, hardening the support material may comprise cooling the support material such that it changes phase from a liquid to a solid (i.e., "freezes") or becomes less compliant.

In some embodiments, the article comprising the substrate (e.g., aluminum metal and/or alloy substrate) and the elongated carbon-based nanostructures is part of a polymer composite. For example, in some embodiments, a support material can be added to the carbon-based nanostructures, as described above. In some embodiments, the elongated carbon-based nanostructures can be mated with an article comprising a support material, for example, by softening the support material, bringing the carbon-based nanostructures into contact with the softened support material, and allowing the softened support material to infiltrate the interstices between the elongated nanostructures. The support material may, according to some embodiments, be subsequently cured or otherwise hardened to form a composite article. According to certain embodiments, the composite article can be metal/graphite fiber-metal hybrid laminate (e.g., where metal foils are placed as layers within polymer-containing composites). In some embodiments, the composite article comprises aluminum-containing wires and/or mesh. Such articles can be used, for example, for mitigating electrostatic discharge and/or lightning strikes. In some embodiments, the article is part of an aramid reinforced aluminum laminate (ARALL), a glass-reinforced (GLARE) composite, and/or a fiber metal hybrid laminate (FMHL).

In some embodiments, the article comprising the aluminum-containing substrate and the elongated carbon-based nanostructures can be a part of and/or further comprise a prepreg. As used herein, the term "prepreg" refers to one or more layers of polymeric material (e.g., thermoset or thermoplastic resin) containing embedded fibers. The embedded fibers in the prepreg can be, for example, fibers of carbon, metal, glass, and/or silicon carbide. In certain embodiments, the fibers of the prepreg are electronically conductive.

U.S. Provisional Application No. 62/780,116, filed Dec. 14, 2018, and entitled "Fabrication of Carbon-Based Nanostructures on Metallic Substrates, Including Aluminum-Containing Substrates" is incorporated herein by reference in its entirety for all purposes.

The following example is intended to illustrate certain embodiments of the present invention, but does not exemplify the full scope of the invention.

Example

This example describes an environmentally benign surface activation process using NaCl aqueous solution and direct synthesis and integration of high-quality and high-yield carbon nanotubes (CNTs) on surface-activated aluminum (sa-Al) thin-sheets and foils through oxidative dehydrogenation chemical vapor deposition (CVD) at low temperatures (400-600° C.). The articles produced in this example had advantageous electrical, thermal, and chemical properties at the interface between the CNTs and the metal substrate due to the lack of a native oxide between the substrate and the CNTs. The surface activation process created a nanopyramid/nanowire network on the surface of the Al substrate, which significantly improved catalytic activity and resulted in direct contact between the metallic Al substrate and the as-synthesized CNTs. The CNT/sa-Al hierarchical structure showed a three-fold decrease in interfacial electrical resistance and a two-fold increase in specific surface area compared with vertically aligned CNT/reference Al structure. Moreover, surface reflectance of the CNT/sa-Al hierarchical structure was $10^{-5}$ over the range from visible to the 20 µm mid-infrared region, and was shown to be insensitive to light incidence angle. The as-synthesized CNT/sa-Al hierarchical structure is promising as a functional structure for sensing, broadband electromagnetic absorption, energy harvesting, and storage.

Integration of CNTs with functional substrates is attractive for numerous applications, such as energy conversion and storage devices, sensing, broadband electromagnetic absorbers, flexible thermal interfaces, electrical interconnects, lightweight and de-icing structural materials for aerovehicles, etc. The process in this example does not require high processing temperature or additional layers, which significantly increase process complexity and cost, and instead can be used with low working temperature substrates such as aluminum, carbon fiber, polymers, etc. Moreover, the bonding process in this example does not require strategically created defects on CNTs, which degrade the physical properties of the CNTs. The methods in this example can also be used in large-scale applications.

Direct synthesis of CNTs on functional substrates at low temperatures is promising to realize in-situ device integration having compatibility and scalability for industrial applications. Al and Al alloys are lightweight, manufacturable, thermally and electrically conductive materials with the highest earth abundancy in metals and extremely low production cost, and thus are a suitable substrate for direct synthesis of CNTs. However, the melting temperatures of Al and Al alloys are much lower than conventional growth temperatures (over 750° C.) of CNTs.

Another advantage of the process in this example is that there is no interfacial dielectric layer (e.g., an oxide layer) between the catalyst layer and the substrate, which results in lower electrical and thermal interface resistance and a decreased risk of detachment of CNTs from the Al substrate during the synthesis process.

A scalable surface activation (SA) process was used to realize high-efficiency growth of high-quality CNTs on an Al substrate over a wide temperature window (400 to 600° C.). Without wishing to be bound by any particular theory, it is believed that the SA process involved pitting corrosion of Al by Cr anions (which were used in aqueous solution), which induced breakdown of localized passive film on Al and Al alloys. The SA process played two roles, 1) it removed the oxide layer and exposed metallic surface for direct contact between CNTs and Al substrate, and 2) it created a nanostructured surface facilitating high catalyst loading and catalytic activity such that synthesis could be conducted at low temperatures.

FIG. 2A shows the fully solution-based SA process for Al sheet or foil, which was initiated by immersion in 10 wt % NaCl aqueous solution with bath sonication for 10 min followed by soaking for 1 hour to allow in-depth penetration of $Cl^-$ and breakdown of native Al oxide layer. The activated Al substrate was then rinsed with DI water and ethanol (99.5%, Sigma-Aldrich). The sample was immediately immersed into catalyst solution (0.1 M iron (II) acetate and 0.1 M cobalt (II) acetate in ethanol) for 3 min after rinsing with minimal drying to remove the ethanol. The catalyst-loaded sa-Al substrate was then dried in the CVD chamber with 1000 sccm Ar flow. The entire process prevented direct exposure of the Al substrate to the ambient and thus avoided the near-instant formation of the native oxide layer. The SA and catalyst deposition process was a solution-based process which is applicable to complex-shaped Al substrates and scalable, such as via roll-to-roll, for large-area industrial production.

The SA process of the Al substrate in an aqueous solution with $Cl^-$ followed three steps (FIG. 2B). First, the chloride ions incorporated in the oxide layer and permeated through the inner metallic bulk. Second, the undulation of the accumulated chloride ions induced localized attack on the oxide layer, resulting in the breakdown of the oxide layer and dissolution of the metallic Al bulk in contact with the aqueous solution. The breakdown of the passive oxide layer and the corroded metastable pits accelerated the pitting corrosion process. Third, the metastable pits later developed into arrays of vertical nanopyramid structures with widths of 20-50 nm. The morphological evolution of the surface-activated Al substrates is shown by the SEM images in FIG. 2C. When the surface treatment time was extended, the porosity and pore size of the Al surface nanoscale roughness features increased substantially. The metastable pits were interconnected owing to the enlargement of the pores, forming a random network of Al nanowires with an average diameter of ca. 20 nm after 10-hour surface activation treatment. The change in the surface roughness was reflected by the color change as shown by the photographs in the insets of FIG. 2C. The glossy metallic color of the as-received Al substrate (i) gradually faded with the increase of the SA treatment time (ii, iii), and eventually became black (iv) owing to the plasmonic resonance of Al nanostructures. The nanoscale-roughened surfaces had very large surface area and excellent wettability, which significantly improved the catalyst loading and deposition uniformity and facilitated good adhesion between the Al substrate and catalyst nanoparticles (FIG. 2B (iv)). Compared with a process that requires an additional layer of Al oxide buffer, surface activation significantly decreased the thermal and electrical interface resistance, as demonstrated for electron conduction subsequently.

A high-fidelity synthetic approach for low-temperature CNT growth was used based on an oxidative dehydrogenation reaction (ODR) of acetylene. This was done with a lab-built setup. The ODR process was thermodynamically favorable, especially at temperatures below 600° C. Here, $CO_2$ was utilized as a growth enhancer to etch away the amorphous carbon formed at lower temperatures, alleviating catalyst poisoning. FIGS. 3A-3B demonstrate representative morphology of CNTs produced by the ODR using $C_2H_2$ with $CO_2$ on Al alloy sheets at 500° C. A CNT forest having a thickness of 500 µm was achieved after a 30-min ODR growth process. The morphology of the CNT structure was a dense and randomly-networked mat, owing to the nanostructured sa-Al substrate. The catalytic activity was proportional to the number of active sites, which was significantly increased by the surface activation process. The fully solution-based SA process and catalyst deposition process facilitated CNT synthesis on freeform and complex-shaped Al substrates as shown in FIG. 3C. The CNT yield, as quantified by the areal surface area (measured using Brunauer-Emmett-Teller (BET) analysis) in FIG. 3D, increased monotonically with the elongation of surface treatment time on the log-log plot, which may be attributed to the fractal growth of metastable pits on the Al substrates realized by the SA process.

Figure 7:
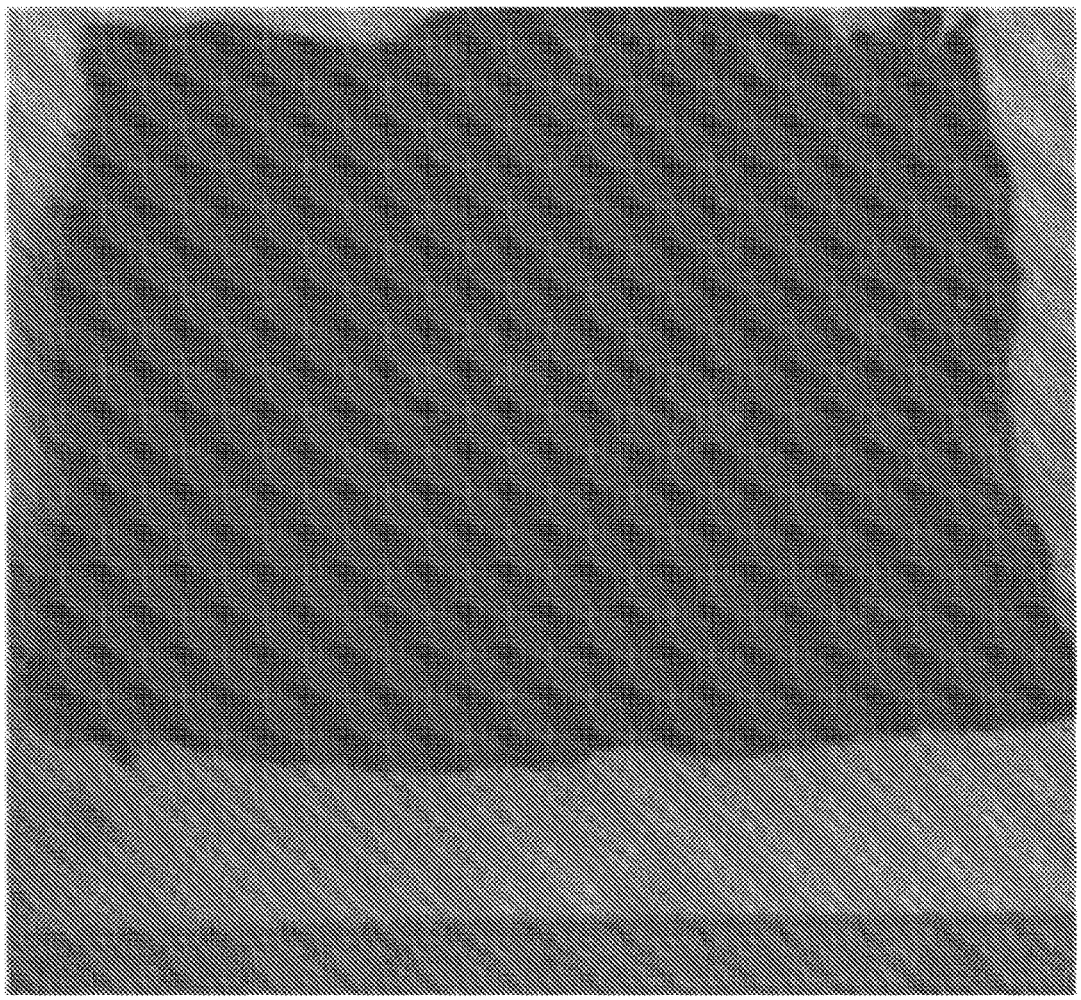
FIG. 7 is a photograph of a 6-inch by 6-inch CNT-Al structure synthesized in a furnace, in accordance with certain embodiments.
Figure 8:
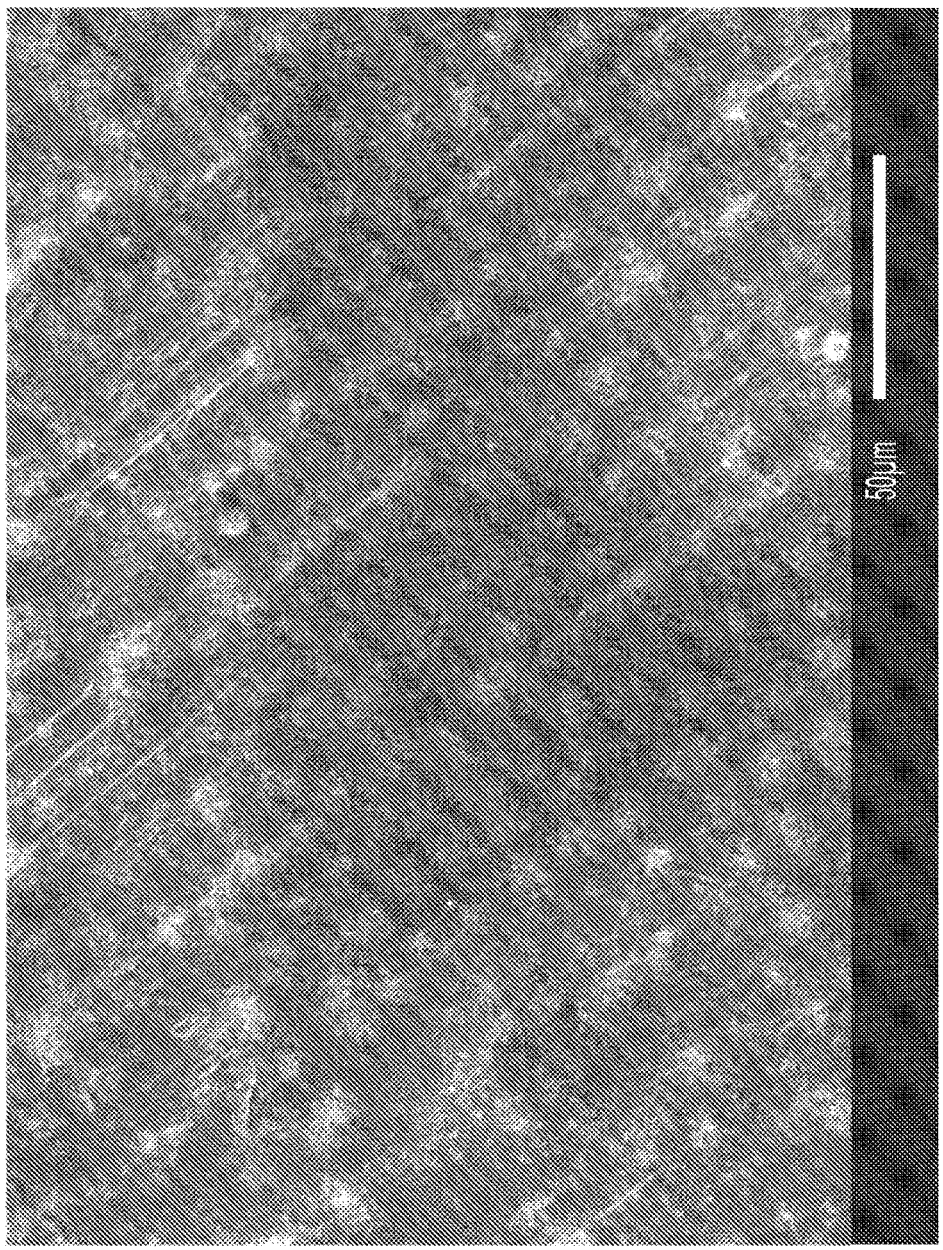
FIG. 8 is an SEM image of CNTs grown from a non-treated Al growth substrate after 10 min.
Figure 9:
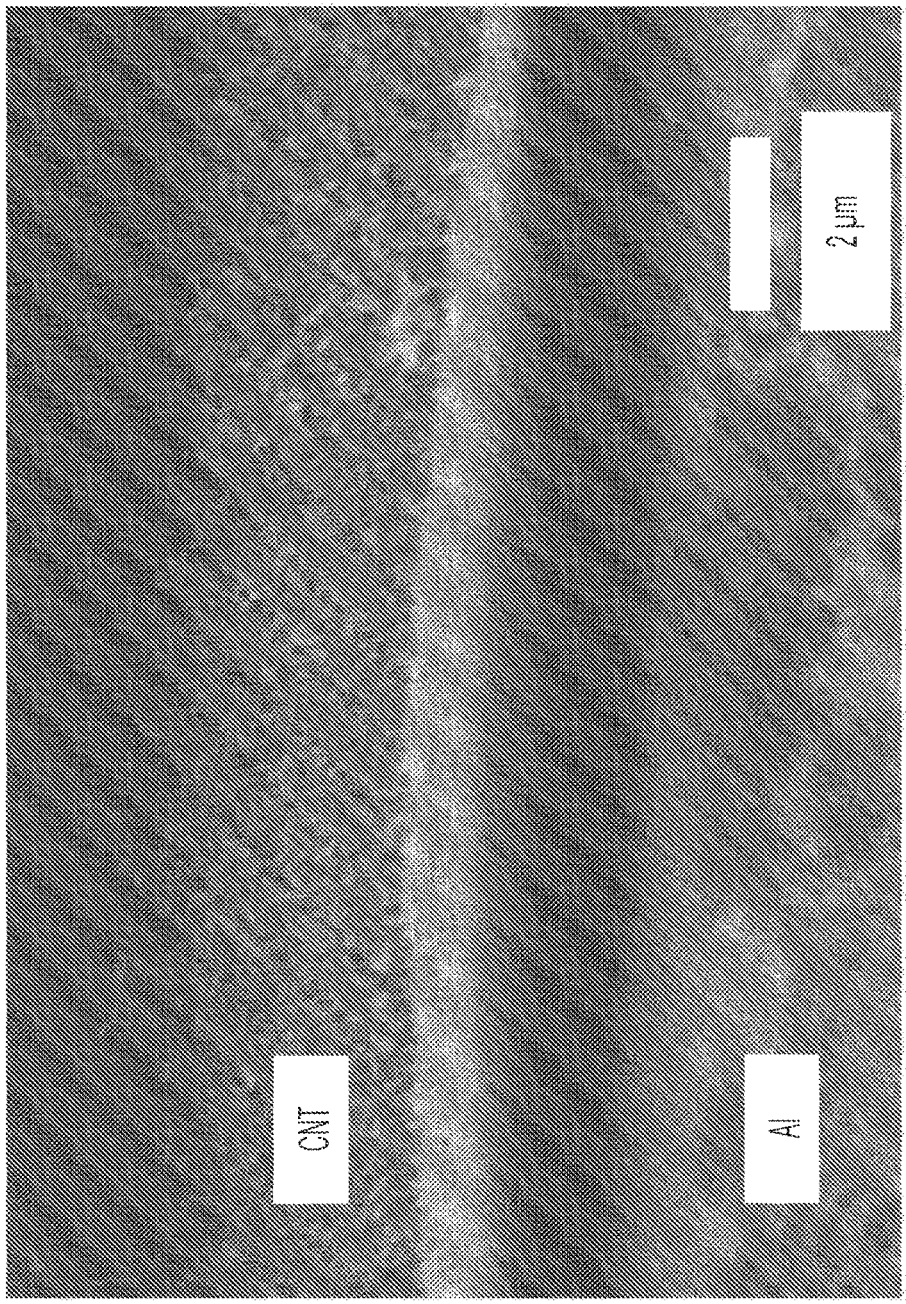
FIG. 9 shows growth of CNTs on an Al substrate for 2 hours without surface activation. The CNT mat is delaminated from the Al substrate owing to the large thermal-expansion mismatch.

High-yield ODR synthesis of CNTs was realized for an extremely broad window from 400 to 600° C., as shown in FIG. 6. Utilizing the flexibility of Al substrate and the wider-range growth temperature window realized in this study, CNTs were synthesized on an sa-Al foil substrate with a 6-inch diameter in a 1-inch tube furnace by rolling, as shown in FIG. 7. For the Al foil substrate without surface activation, the morphology of as-synthesized CNTs was sparsely distributed spots after 10-min ODR growth process (FIG. 8). The thermal-expansion mismatch induced delamination of CNTs from the Al substrates after 2-hour ODR process was also observed for the non-treated substrate, which caused premature termination of the growth (FIG. 9). The surface activation process in this example provides flexibility in the design of continuous CNT-on-Al manufacturing system and avoids extreme susceptibility to reaction temperature.

Figure 3E:
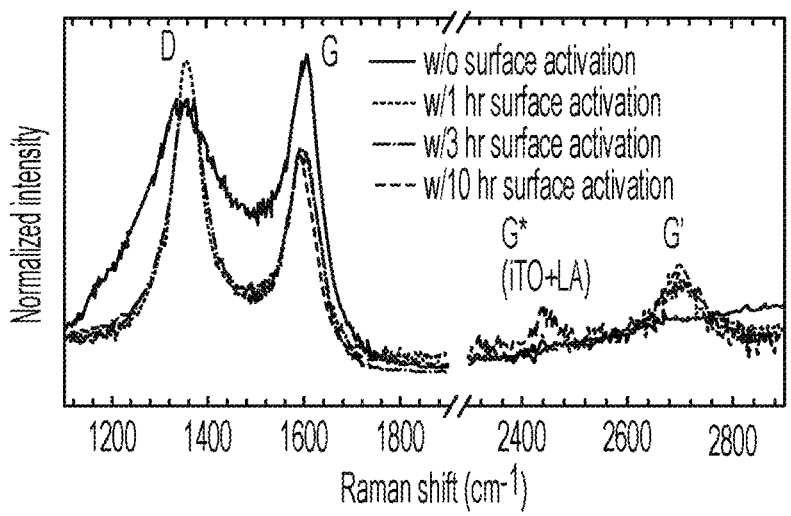
FIG. 3E includes Raman spectra of CNTs synthesized on a non-treated Al substrate and on an sa-Al substrate with different surface activation times, in accordance with certain embodiments.
Figure 3F:
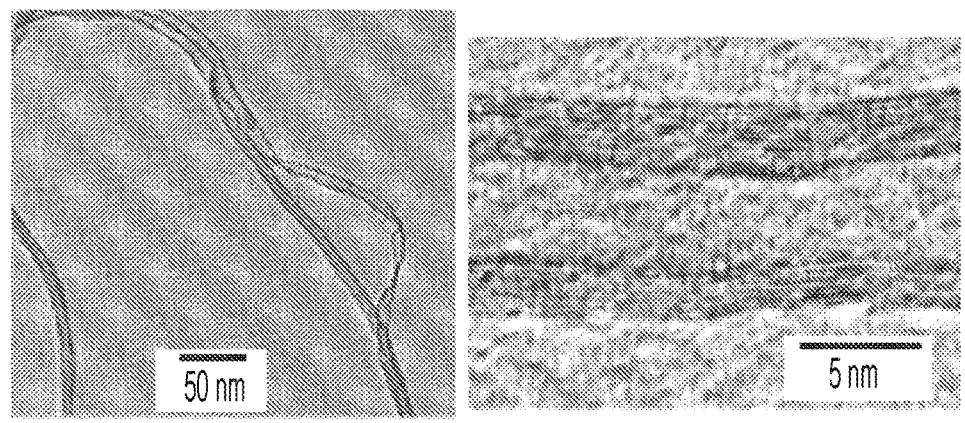
FIG. 3F includes TEM images of CNTs synthesized on a surface-activated Al substrate, in accordance with some embodiments.

Raman spectra in FIG. 3E and curve fitting using Lorentzian line-shape (FIG. 10) show the significantly improved G/D ratio (3.7 fold) and clearly defined G' peak for the CNTs synthesized on the sa-Al substrates compared with those on the non-treated Al substrate, demonstrating a lower level of defects and a higher level of graphitization, respectively. The peaks located at 1150 and 1450 $cm^{-1}$ representing amorphous $sp^3$ carbon were also quenched. This likely resulted from the uniform distribution of catalysts and improved catalytic activity on the Al nanopyramid/nanowire network. Extending the surface treatment time did not substantially improve the graphitization level and purity of the as-synthesized CNTs. As shown by the TEM images in FIG. 3F, the CNTs synthesized on the activated Al surface had high-crystalline wall structure, with an average wall number of 6-8 and diameter of 10 nm, while the CNTs synthesized on the Al surface without surface activation were highly defective, demonstrating turbostratic fishbone structures with a low graphitization level and an average diameter of more than 20 nm (FIG. 11). The TEM images and the Raman spectra demonstrate that the quality of the CNTs synthesized at 500° C. on the surface activated Al substrate were comparable to that of the wafer-grown CNTs synthesized at temperatures over 750° C.

Figure 4A:
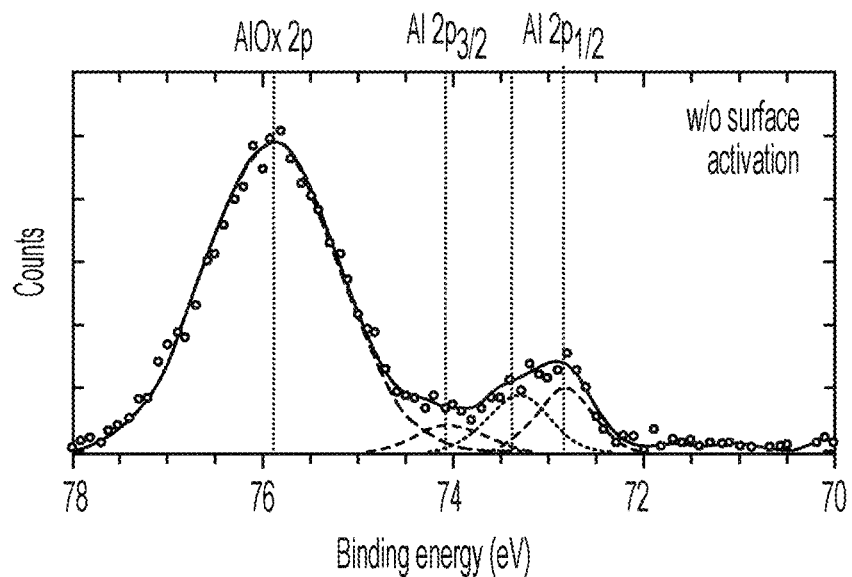
FIG. 4A is an Al 2p XPS spectrum of an Al substrate without surface activation.
Figure 4B:
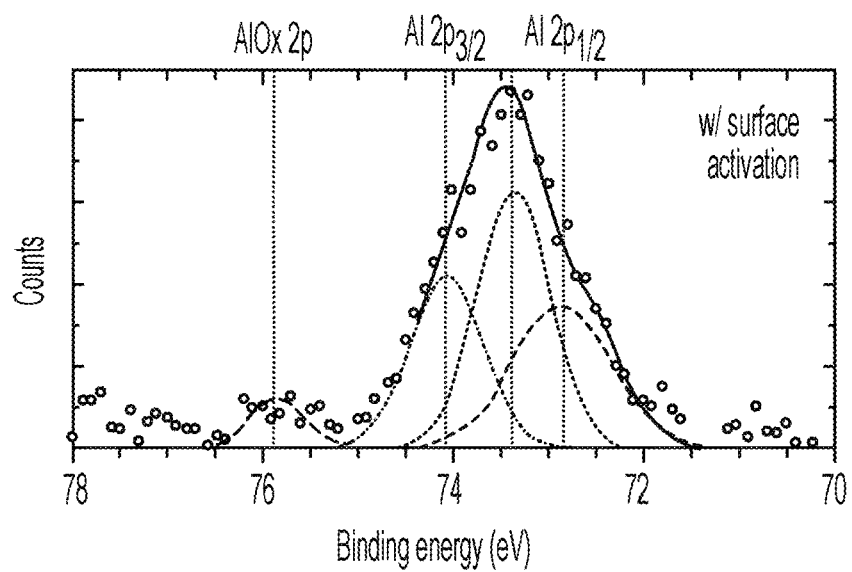
FIG. 4B is an Al 2p XPS spectrum of an Al substrate with surface activation, in accordance with certain embodiments.

To investigate the mechanism of the simultaneously enhanced yield and crystallinity of CNTs, the chemical status of the activated surface was probed by XPS. As shown by the Al 2p XPS curves in FIGS. 4A-4B, the oxide peak (75.9 eV) of the as-received Al substrate was very strong because of the dense native oxide, while the oxide peak of the sa-Al substrate almost disappeared, demonstrating that the SA process is effective to remove the native oxide layer on Al substrates. It is believed that the removal of the oxide layer can cause elemental diffusion of catalysts into Al substrates. A bimetallic catalyst using Fe and Co was designed to address this issue. As evidenced in the XPS survey spectra in FIGS. 12A-12C, for the mono-metallic catalyst, the Co and Fe peaks completely disappeared after annealing the sa-Al at 500° C. for 30 min. However, as shown in Supporting Information FIG. 12C, the subsurface elemental diffusion of the bimetallic catalyst was significantly alleviated, with a large amount of Fe—Co retained on the surface after annealing at 500° C. for 30 min, due to the anchoring effect of the Fe—Co intermetallic compound.

Figure 4C:
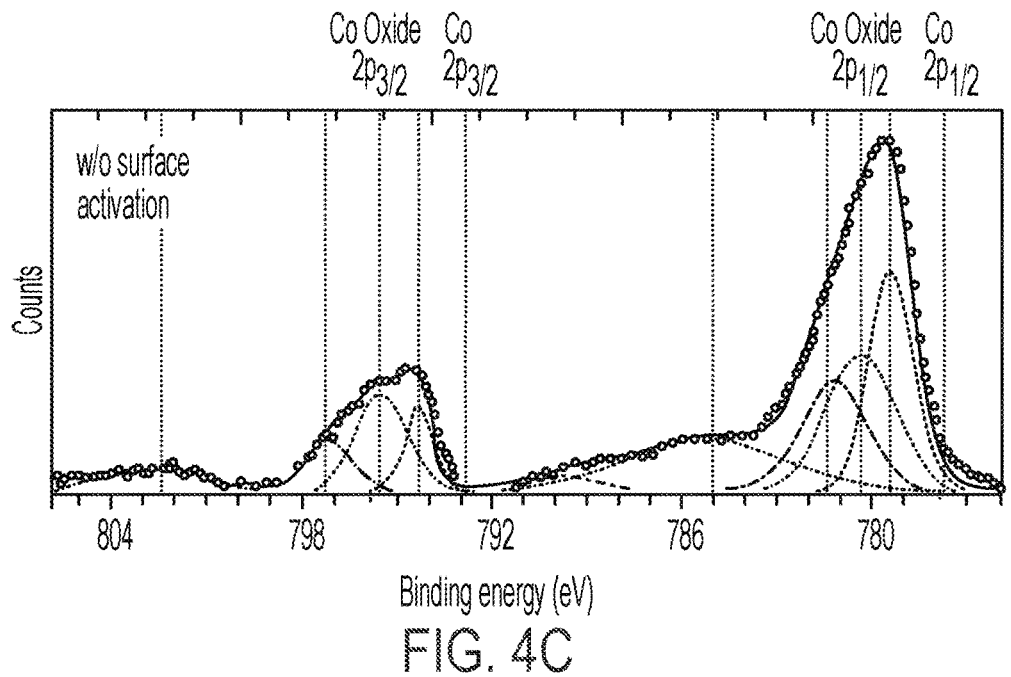
FIG. 4C includes Co 2p1/2 and 2p3/2 XPS spectra of the annealed catalysts on an Al substrate without surface activation.
Figure 4D:
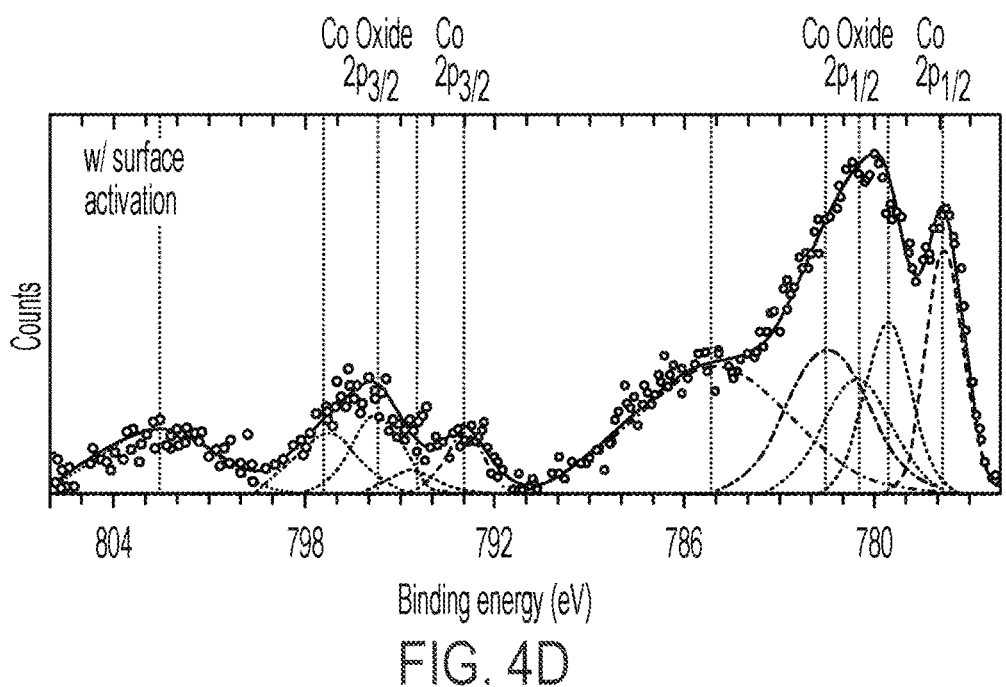
FIG. 4D includes Co 2p1/2 and 2p3/2 XPS spectra of the annealed catalysts on an Al substrate with surface activation, in accordance with some embodiments. In both FIGS. 4C and 4D, the catalysts were annealed under the same oxygen dehydrogenation reaction (ODR) process without flowing a carbon precursor.

The exposed metallic Al surface served as a solid-state reducing agent for the catalyst during the annealing process. First, the element diffusion resulted in the formation of the Al-rich intermetallic compound which was reported to be an effective catalytically active center for dehydrogenation. As shown by the XPS spectra in FIGS. 4C-4D, the 2p 1/2 (793.3 eV) and 2p 3/2 (777.8 eV) XPS peaks of the metallic Co phase emerged after annealing for the surface treated sample, while the Co phase for the non-treated sample was completely oxide. Second, the intermetallic phase FeCo (780.6 eV) was observed. The nanostructured Al served as a buffer layer which could absorb and trap iron atoms and thus facilitated uniform and well-dispersed catalytic particles. Third, after the surface activation, the higher surface area nanostructured sa-Al surface enhanced the adsorption of hydrogen and facilitated the hydrogen spillover onto catalysts, which increased the catalytic activity at lower CVD temperatures.

Figure 4E:
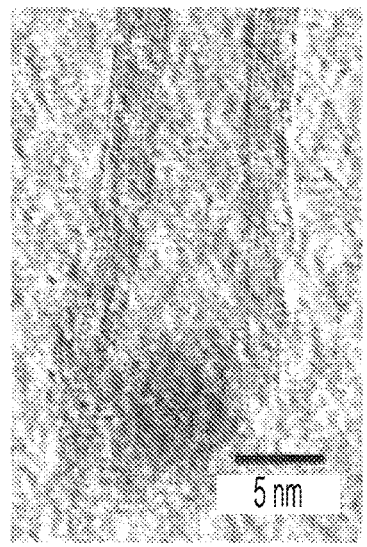
FIG. 4E is a representative TEM image of a catalyst nanoparticle inside a CNT, in accordance with certain embodiments.
Figure 4F:
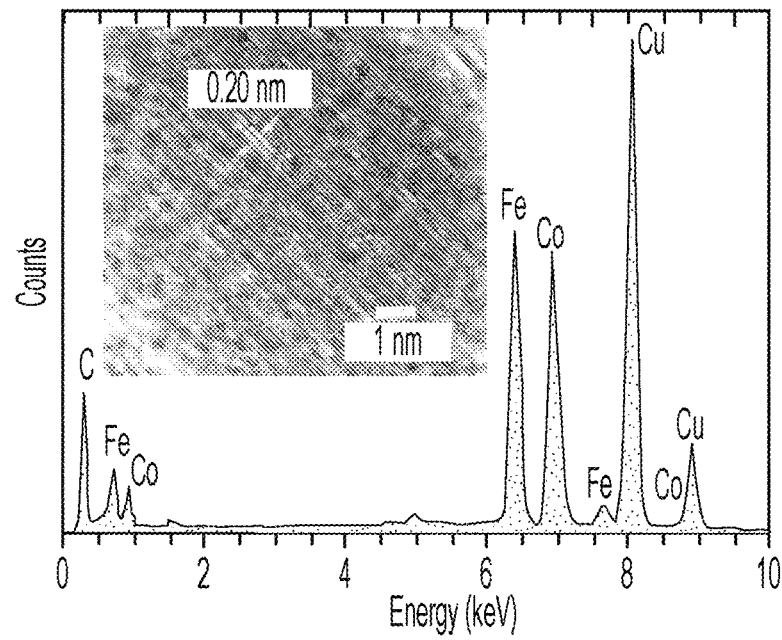
FIG. 4F includes lattice distance and EDS-TEM analysis of an FeCo alloy catalyst scratched from the sa-Al substrate after ODR synthesis of CNTs, in accordance with certain embodiments.
Figure 4G:
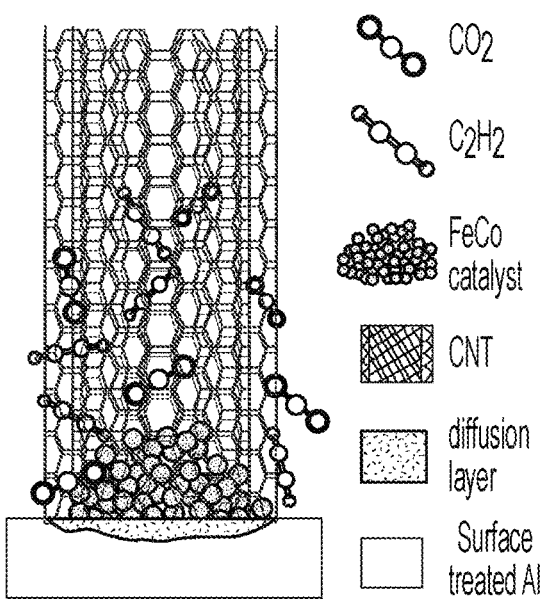
FIG. 4G includes schematics of the ODR process for CNT synthesis on the sa-Al substrate, in accordance with certain embodiments.

The exemplary TEM image in FIG. 4E shows that the average diameter of the catalyst nanoparticle was ca. 6 nm, which matches that of the grown CNTs, demonstrating a characteristic tangential growth mode. The catalyst nanoparticle was mainly composed of Fe and Co, as shown by the EDS-TEM analysis in FIG. 4F. The exemplary high-resolution TEM image in the inset of FIG. 4F shows the lattice distance of the catalyst nanoparticle was 0.20 nm, matching those of the Fe—Co intermetallic compounds (FeCo and $Fe_{0.72}Co_{0.28}$). The schematic of the high-quality direct synthesis of CNTs on the surface-activated Al substrate is shown in FIG. 4G. The bimetallic catalyst substantially lowered the activation energy for CNT synthesis and maintained high catalytic activity at relatively low temperatures.

Figure 5C:
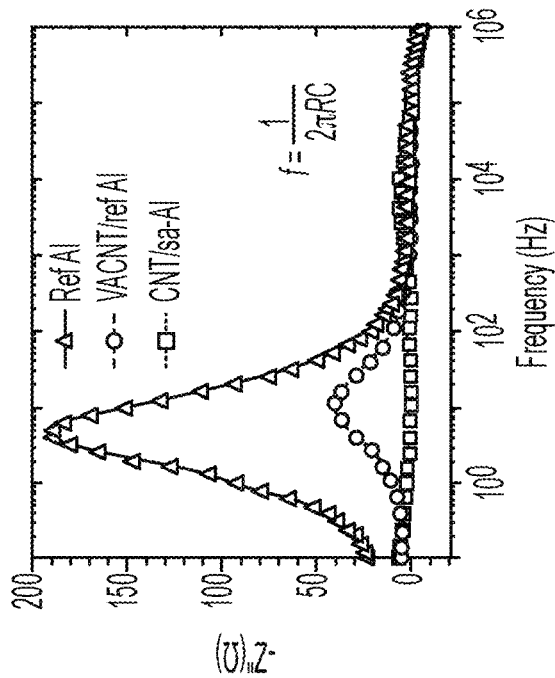
FIG. 5C is a Bode plot of ref Al, VACNT/ref Al and CNT/sa-Al hierarchical structures, in accordance with some embodiments.
Figure 5B:
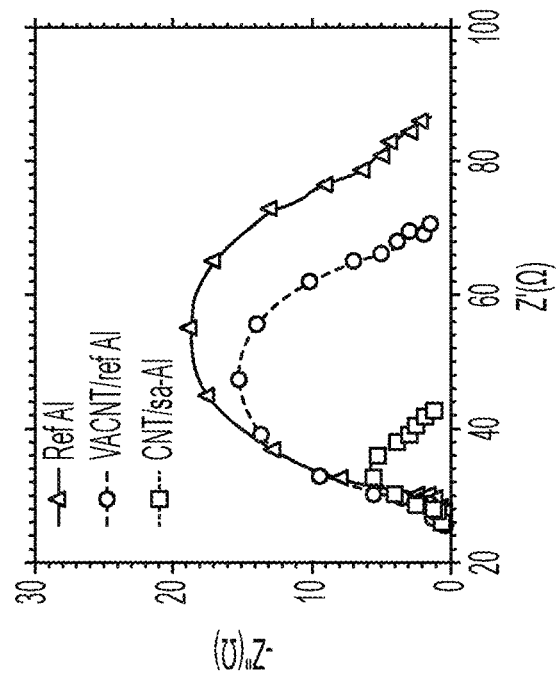
FIG. 5B is a Nyquist plot of ref Al, VACNT/ref Al and CNT/sa-Al hierarchical structures, in accordance with certain embodiments.
Figure 5A:
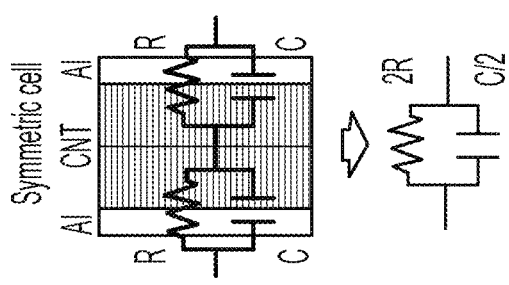
FIG. 5A is a schematic illustration of an example of symmetric cell setup for impedance measurement.

The direct contact between metallic Al substrate and as-synthesized CNTs could potentially block the formation of the dense and continuous passive oxide layer. To characterize the interface resistance between CNTs and Al substrates, symmetric resistance tests were fabricated using two identical samples synthesized by the same condition as shown in FIG. 5A, and electrochemical impedance spectroscopy (EIS) was used to analyze the interface resistance between CNTs and the Al substrate. FIGS. 5B-5C, respectively, present the corresponding Nyquist and Bode plots of symmetric cells based on CNT/sa-Al (with surface activation), transferred vertically aligned carbon nanotubes (VACNTs) on reference Al substrate (VACNT/ref Al) as well as a reference Al—Al (both without surface activation). After curve fitting using the equivalent circuit shown in FIG. 5A, the charge transfer resistance of the CNT/sa-Al interface was found to be ca. 5.2Ω, which is two-fold lower than that of the transferred CNT on Al, and 5-fold lower than that of the Al—Al reference sample. The frequency shift in the Bode plot demonstrates faster electron transfer at the interface between CNTs and the conductive substrate owing to the oxide removal by the surface activation.

Figure 5E:
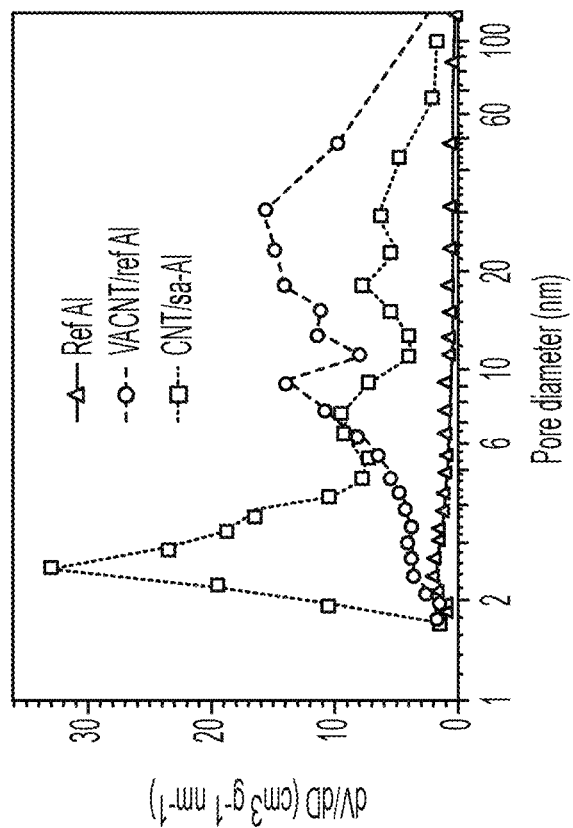
FIG. 5E is a plot of surface area of the ref Al, VACNT/ref Al and CNT/sa-Al hierarchical structures using Brunaue-Emmett-Teller (BET) analysis, in accordance with some embodiments.
Figure 5D:
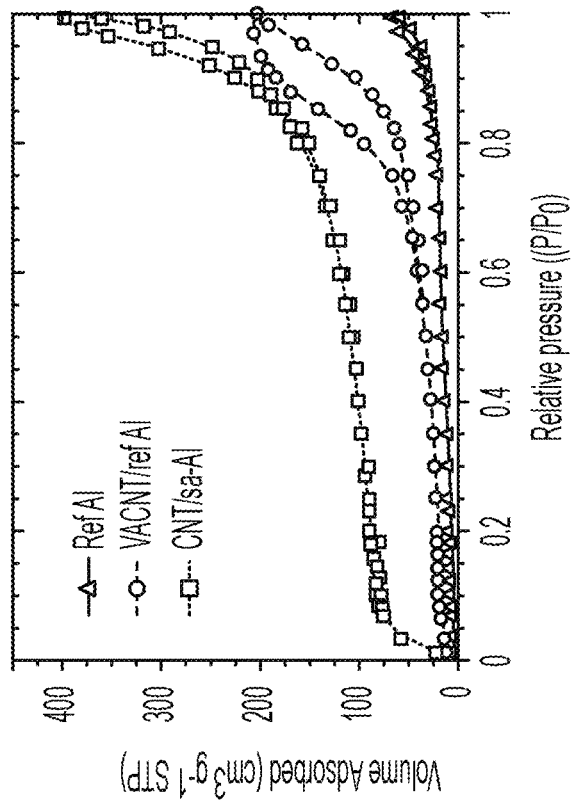
FIG. 5D is a plot of pore size distribution of the ref Al, VACNT/ref Al and CNT/sa-Al hierarchical structures using Brunauer-Emmett-Teller (BET) analysis, in accordance with some embodiments.

Furthermore, the surface area of the CNT-Al samples was characterized by the Brunauer-Emmett-Teller (BET) analysis. FIG. 5D presents the $N_2$ sorption/desorption isotherms of the CNT-Al samples, with the pore size and cumulative sorption volume data. The type IV isotherms have negligible hysteresis, evidence of the porous structure predominantly formed by mesopores. The CNT/sa-Al nanostructure possessed a surface area of 245.7 $m^2/g$ and a bi-modal pore size distribution, with the majority as small pores ranging from 2-5 nm and a small portion as medium pores ranging from 30-50 nm (FIG. 5E). Additionally, the broad knee in the low $P/P_0$ range and well-defined plateaus of adsorbed volume further indicated the existence of numerous mesopores and micropores. The bi-modal pore size distribution may facilitate the rapid and complete adsorption/desorption of carbon precursors, and prevent the $H_3$ hysteresis loop in the reference CNT forest transferred on the Al substrate. The extremely low interface electrical resistance combined with the excellent pore structure makes the oxide-free CNT-Al structures an ideal candidate hierarchical functional structure for energy storage applications such as batteries and supercapacitors.

Figure 5F:
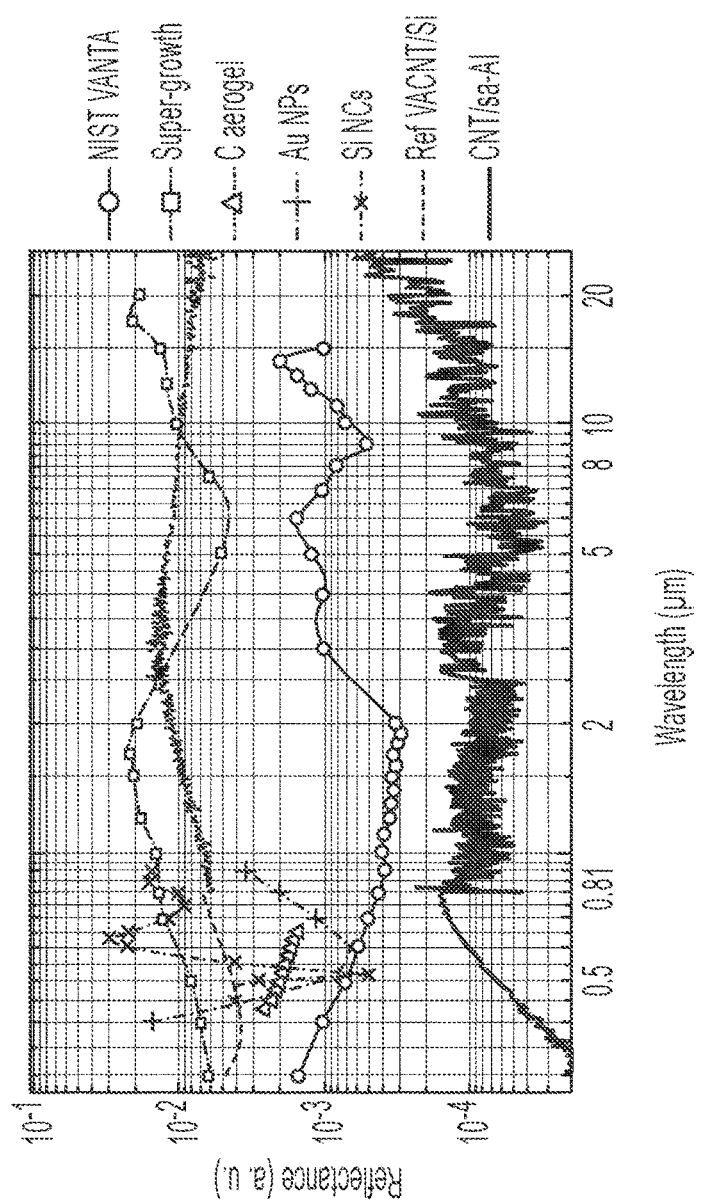
FIG. 5F is a plot of reflectance of CNT/sa-Al hierarchical structures over visible, near-IR and mid-IR wavelength ranges, compared with the reflectance of NIST VANTA CNT structures, super-growth SWNT forest, carbon aerogel, Au nanoparticles arrays, Si nanocylinder arrays, and reference VACNT forest growth on a wafer, in accordance with certain embodiments.
Figure 5G:
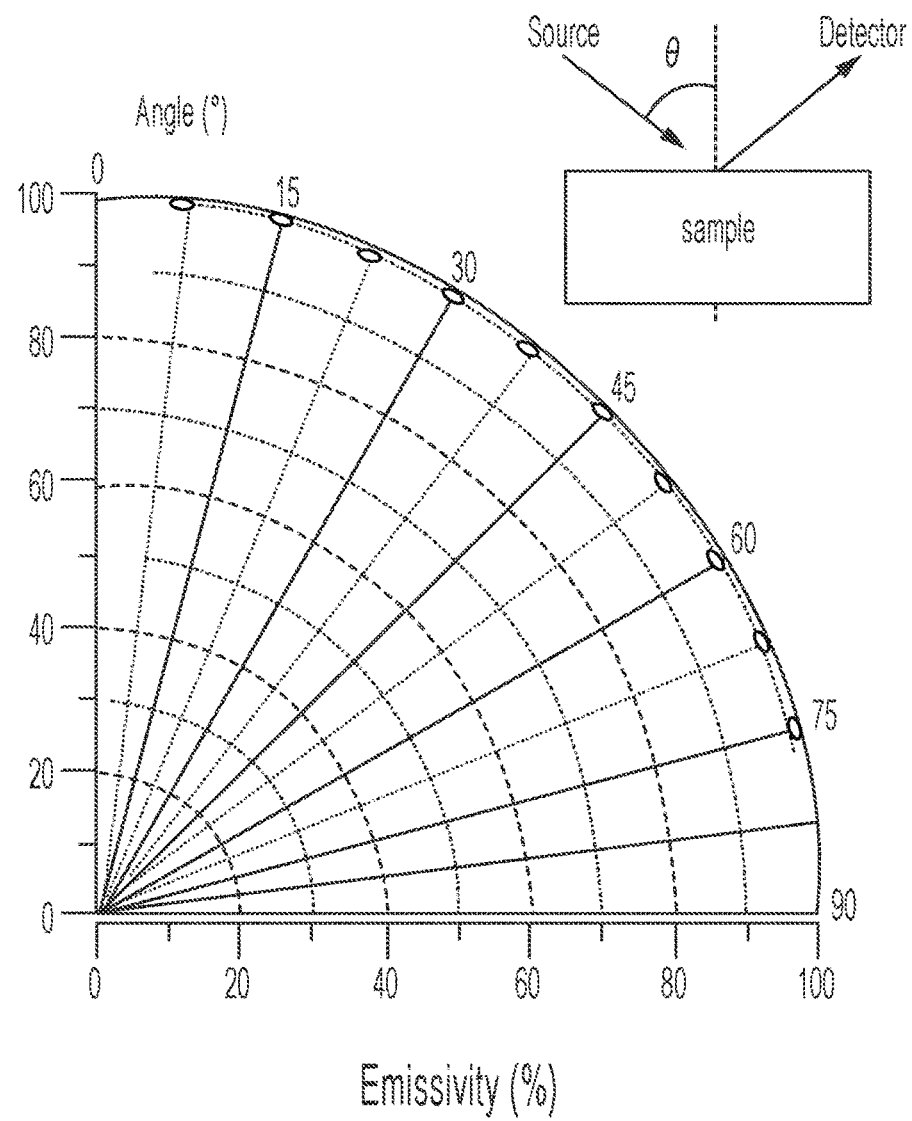
FIG. 5G is a plot of angular dependence of average emissivity of a CNT/sa-Al hierarchical structure over the visible wavelength range, in accordance with some embodiments.

The CNT/sa-Al structure composed of the upper CNT layer with bimodal pore size distribution and the bottom layer of Al nanowire network is also extremely effective for light trapping and sensing. FIG. 5F shows the surface spectral reflectance of the oxide-free CNT-Al structure, compared with that of the reference CNT forest grown on a Si wafer, NIST VANTA, super-growth SWNT forest, carbon aerogel, gold nanoparticles, and silicon nanocylinder array-based Mie resonator using UV-vis-NIR spectroscopy and Fourier-transform infrared spectroscopy. The CNT/sa-Al showed low reflectance of $10^{-5}$ over the UV, visible, near-infrared and mid-infrared range. More importantly, the CNT/sa-Al structure showed omni-directional blackbody optical absorption, as shown in FIG. 5G. The extremely low spectrum and angular reflectance of the CNT-Al substrate could be beneficial for applications in solar steam generation, near-infrared sensing and various space science applications including astronomy detectors, straylight absorbers, and starshades.

Figure 6A:
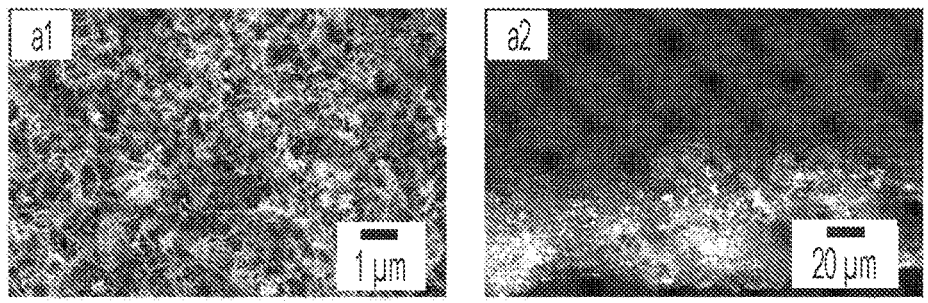
FIG. 6A includes top and cross-sectional views of CNTs grown on an Al substrate at 400° C., in accordance with certain embodiments.
Figure 6B:
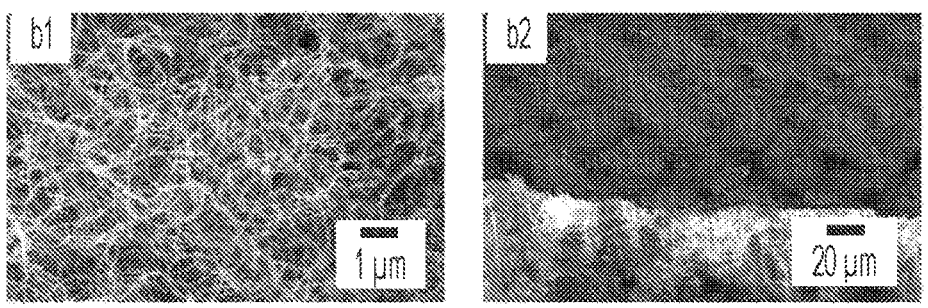
FIG. 6B includes top and cross-sectional views of CNTs grown on an Al substrate at 500° C., in accordance with some embodiments.
Figure 6C:
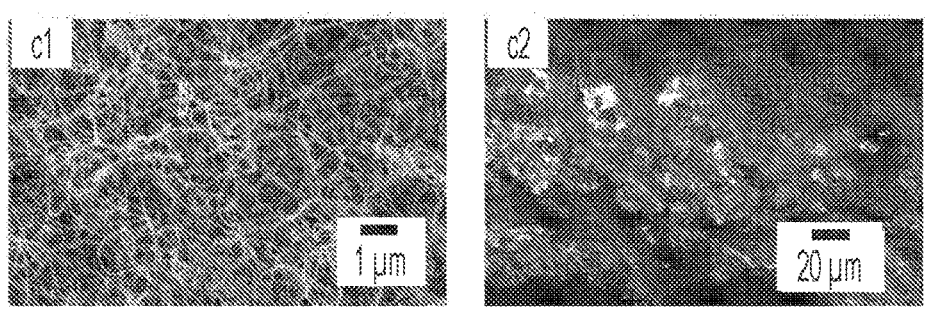
FIG. 6C includes top and cross-sectional views of CNTs grown on an Al substrate at 600° C., in accordance with certain embodiments.

FIG. 6A includes top and cross-sectional views of CNTs grown on an Al substrate at 400° C. FIG. 6B includes top and cross-sectional views of CNTs grown on an Al substrate at 500° C. FIG. 6C includes top and cross-sectional views of CNTs grown on an Al substrate at 600° C.

FIG. 7 is a photograph of a 6-inch by 6-inch CNT-Al structure synthesized in a furnace. FIG. 8 is an SEM image of CNTs grown from a non-treated Al growth substrate after 10 min. FIG. 9 shows growth of CNTs on an Al substrate for 2 hours without surface activation. The CNT mat is delaminated from the Al substrate owing to the large thermal-expansion mismatch.

Figure 10:
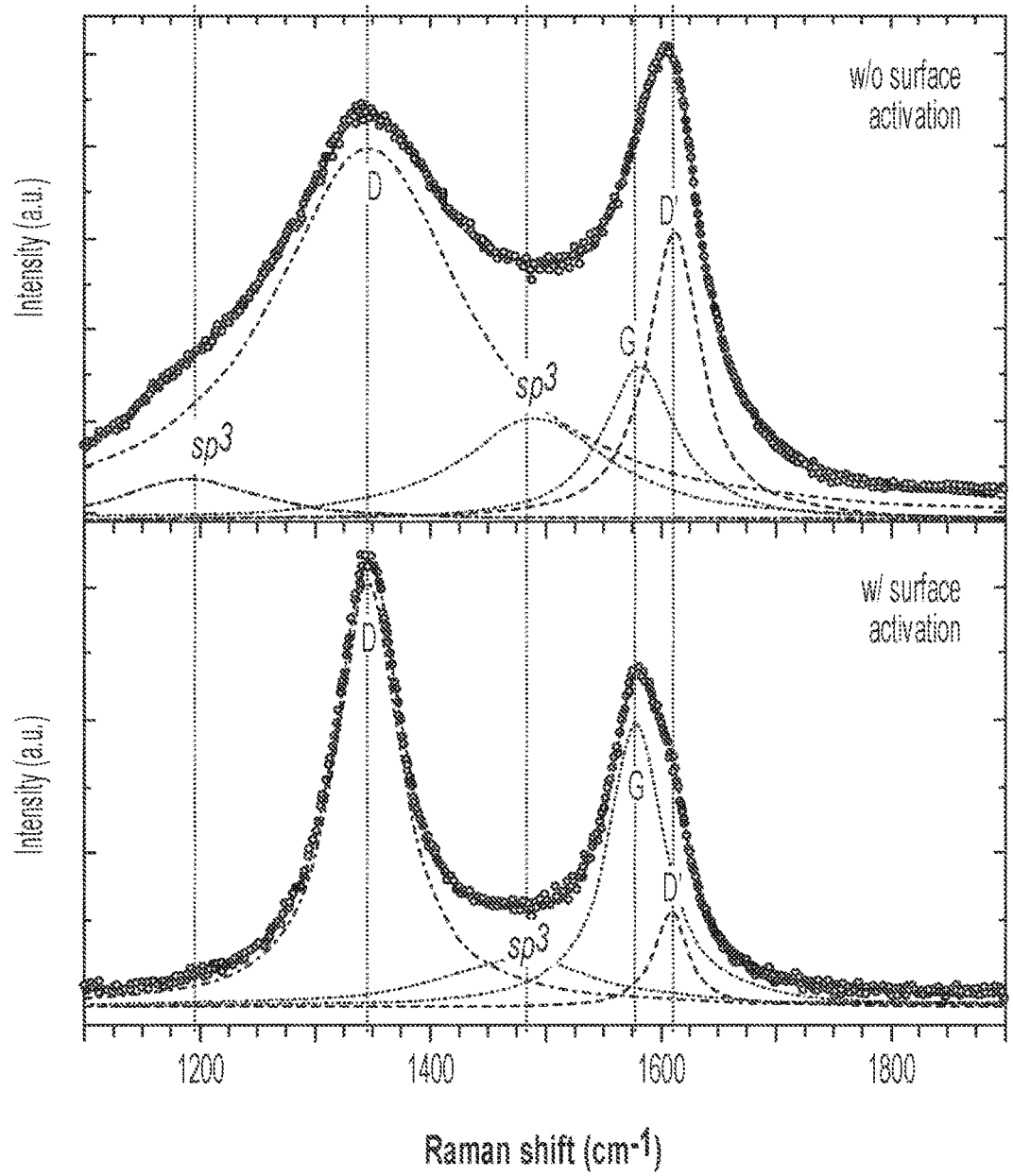
FIG. 10 shows curve fitting of Raman spectra of CNT-Al samples with and without surface activation for the evaluation of ID/IG ratio, in accordance with certain embodiments.

FIG. 10 shows curve fitting of Raman spectra of CNT-Al samples with and without surface activation for the evaluation of ID/IG ratio.

Figure 11A:
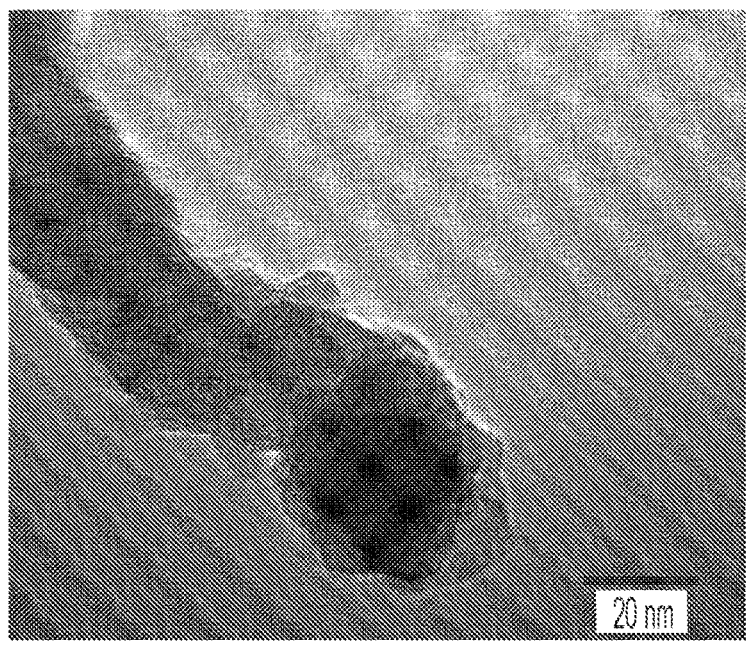
FIG. 11A is a TEM image of carbon nanostructures grown on Al substrates without surface treatment. The average diameter of the carbon nanostructures is about 26 nm.
Figure 11B:
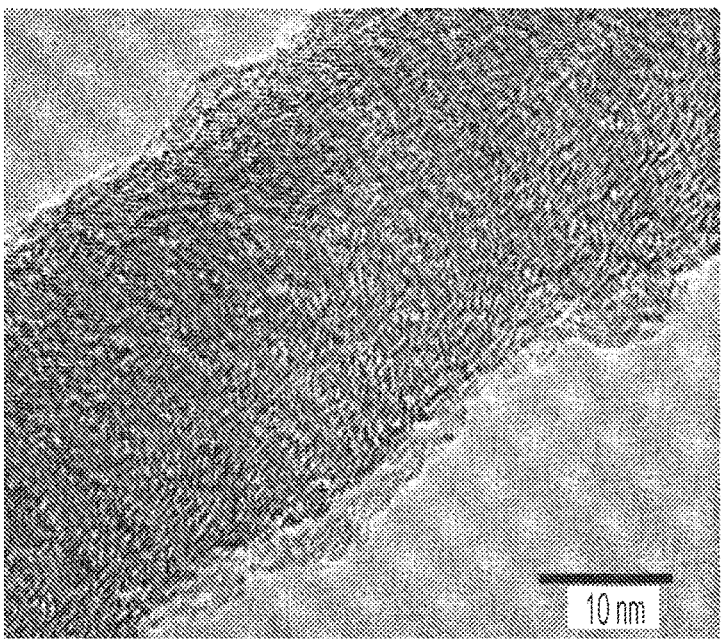
FIG. 11B is a magnified high-resolution TEM image of the structure in FIG. 11A, showing turbostratic structures.

FIG. 11A is a TEM image of carbon nanostructures grown on Al substrates without surface treatment. The average diameter of the carbon nanostructures is about 26 nm. FIG. 11B is a magnified high-resolution TEM image of the structure in FIG. 11A, showing turbostratic structures.

Figures 12A, 12B, 12C:
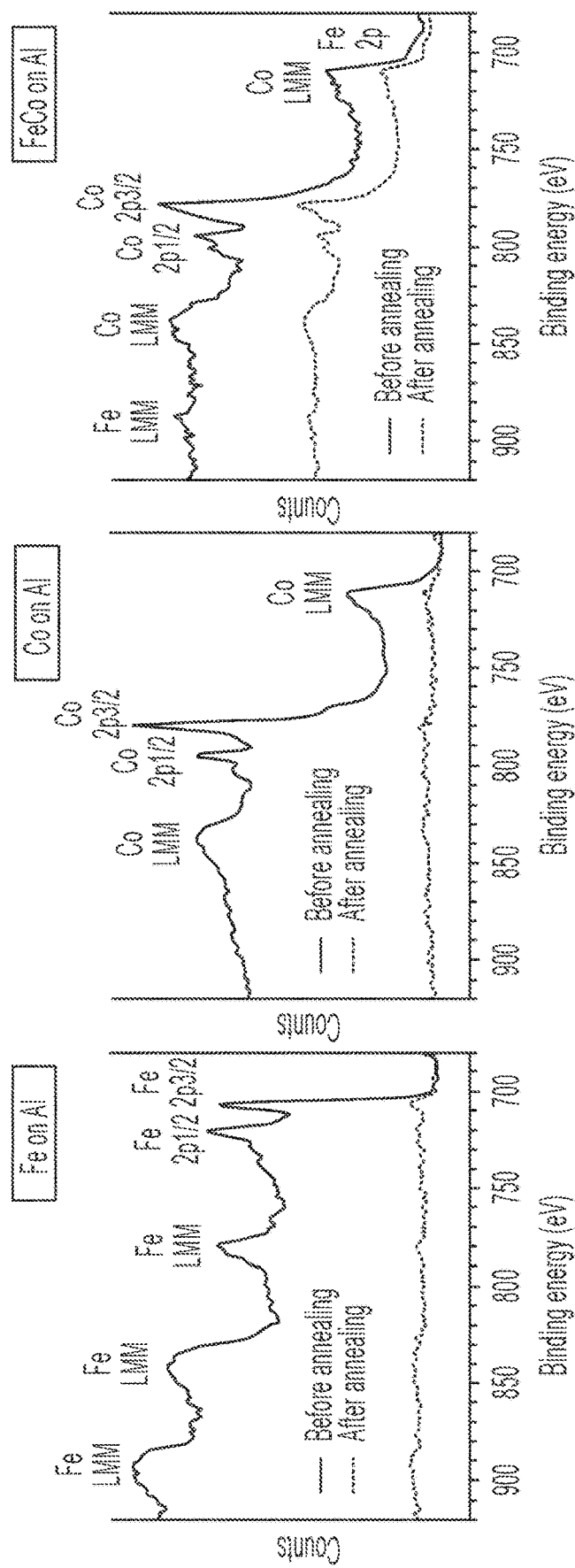
FIG. 12A is a survey spectrum of Fe catalyst on an Al substrate before and after annealing at 500° C. for 30 minutes, in accordance with certain embodiments.
FIG. 12B is a survey spectrum of Co catalyst on an Al substrate before and after annealing at 500° C. for 30 minutes, in accordance with some embodiments.
FIG. 12C is a survey spectrum of FeCo catalyst on an Al substrate before and after annealing at 500° C. for 30 minutes, in accordance with some embodiments.

FIG. 12A is a survey spectrum of Fe catalyst on an Al substrate before and after annealing at 500° C. for 30 minutes. FIG. 12B is a survey spectrum of Co catalyst on an Al substrate before and after annealing at 500° C. for 30 minutes. FIG. 12C is a survey spectrum of FeCo catalyst on an Al substrate before and after annealing at 500° C. for 30 minutes.

Figures 13A, 13B:
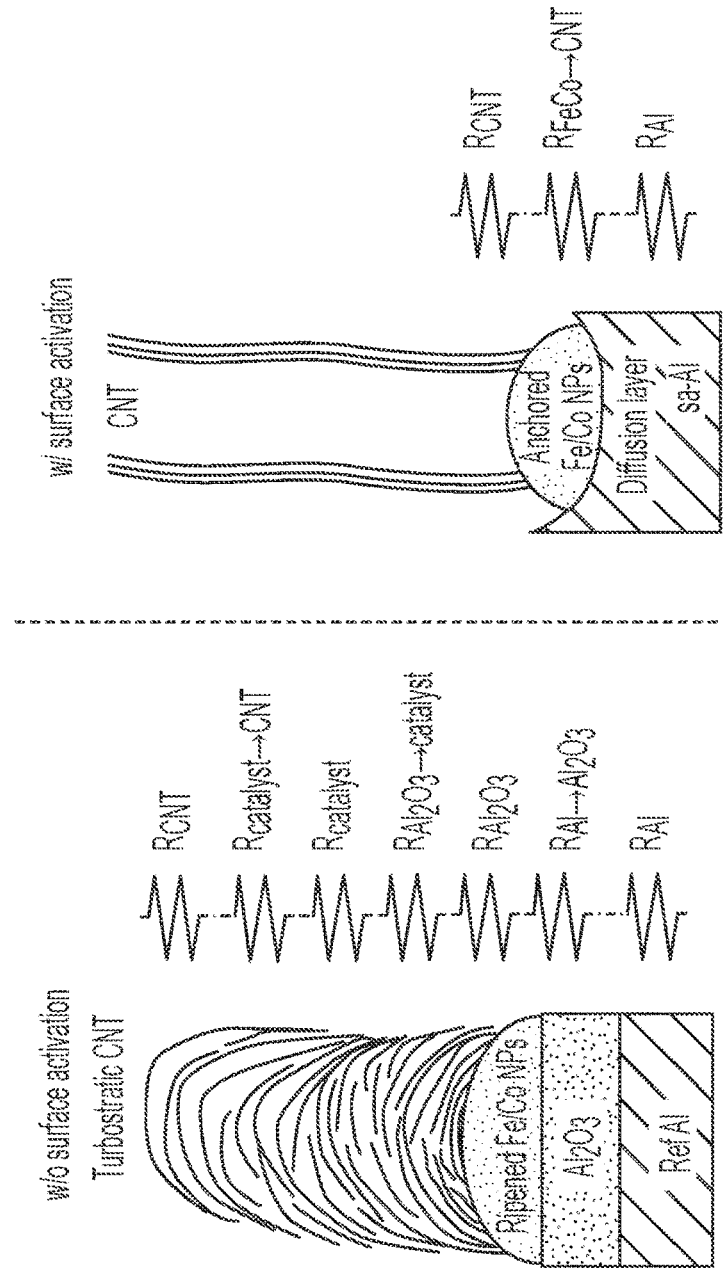
FIG. 13A is a diagram of an equivalent circuit for conventional CNT growth on Al without surface activation.
FIG. 13B is a diagram of an equivalent circuit for oxide-free CNT growth on Al with surface activation, in accordance with certain embodiments.

FIG. 13A is a diagram of an equivalent circuit for conventional CNT growth on Al without surface activation. FIG. 13B is a diagram of an equivalent circuit for oxide-free CNT growth on Al with surface activation, in accordance with certain embodiments.

In summary, the surface activation process in this example facilitated direct synthesis of high-yield and high-quality CNTs on an Al substrate using facile solution processing to create a broad growth temperature window for high-quality CNTs on Al. The surface activation process introduced nanoscale roughness that enhanced catalytic activity and removed the native oxide layer to realize direct contact between CNTs and the metallic Al substrate. Moreover, the entire process was intrinsically scalable, as both the surface activation process and the direct synthesis of CNTs could be deployed in a roll-to-roll fashion using solution baths. The oxide-free CNT-Al structure features with high surface area, enhanced charge transfer and low optical and IR wavelength surface reflection facilitate multi-functionality for applications in energy storage devices, solar cells, thermal/electrical interconnects, solar desalination, and space science instruments.

Experimental Details

Surface Activation of Al and Catalyst Deposition: Two kinds of materials were used: an Al alloy sheet with thickness of 500 μm (Alcoa 4 series) and Al metal foil with thickness of 2 μm. The Al alloy contained 0.6 wt % Si, 1.2 wt % Mn, 0.6 wt % Zn, 0.3 wt % Fe and 0.26 wt % Cu. The Al alloy sheet and Al metal foil were immersed in 10 wt % NaCl aqueous solution with bath sonication until the desired structure was obtained. The activated Al substrate was rinsed by DI water and ethanol (99.5%, Sigma-Aldrich) and subsequently immersed into catalyst solution before drying. The catalyst solution contained 0.1 M iron (II) acetate and 0.1 M cobalt (II) acetate in ethanol.

Low-Temperature CNT Synthesis: The CNT structures were synthesized by oxygen dehydrogenation reaction (ODR) using a home-built setup. Before synthesis, the activated Al substrate loaded with catalyst solution was dried in a quartz tube with 1000 sccm Ar flow to avoid the formation of oxide. The substrate was then heated to a preset temperature (ranging from 400 to 600° C.) and kept for 10 min under 400 sccm $H_2$ (Airgas) and 100 sccm Ar (Airgas). CNTs were grown using 167 sccm 10% $C_2H_2$ diluted in Ar and 17 sccm $CO_2$ and 800 sccm Ar for typically 30 min. After growth, the sample was cooled down to room temperature under 1000 sccm Ar flow.

Catalyst and CNT Characterization: The morphologies of Al substrate and CNTs were observed by Zeiss Merlin SEM with Gemini II column. Atomic structures of CNTs and catalysts were observed by JEOL 2010 Advanced High Performance TEM operating at 200 KV with a lanthanum hexaboride cathode. The surface chemical status of activated Al and catalysts were carried out using Physical Electronics Versaprobe II X-ray Photoelectron Spectrometer. Raman spectra of CNTs were performed by Horiba Jobin Yvon Model HR800, using 532 nm laser excitation.

Electrical and Optical Properties Characterization. The optical properties were measured by UV-vis-NIR transmission/reflectance spectrophotometer (Varian/Cary-5000) using a commercial reference aluminum coated mirror (Thorlabs). The angular dependence of the optical properties was measured using a variable angle spectral reflectance accessory (VASRA). The Brunauer-Emmett-Teller surface area analysis was performed by Micromeritics ASAP2020. The impedance and electrical properties of CNT-Al structure were characterized by Solartron 1287A.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article comprising:
   a substrate comprising aluminum metal and/or aluminum alloy;
   a catalyst comprising at least one metallic species arranged such that the at least one metallic species is in direct contact with metallic aluminum of the substrate; and
   elongated carbon-based nanostructures in direct contact with the catalyst;
   wherein the aluminum metal and/or aluminum alloy of the substrate has at least one cross-sectional dimension of at least about 1 mm; and
   wherein the at least one metallic species comprises Fe, Co, Ni, Cu, Au, and/or Al.

2. The article of claim 1, wherein the substrate consists of an aluminum metal substrate or an aluminum alloy substrate.

3. The article of claim 1, wherein the catalyst is in contact with a surface portion of the substrate that has nanoscale surface roughness.

4. The article of claim 1, wherein the at least one metallic species comprises at least one non-aluminum metallic species.

5. The article of claim 1, wherein the elongated carbon-based nanostructures comprise carbon nanotubes, carbon nanowires, and/or carbon nanofibers.

6. The article of claim 1, wherein a surface reflectance of the article is $1 \times 10^{-3}$ or less over the UV range, and/or $6 \times 10^{-4}$ or less over the visible range, and/or $6 \times 104$ or less over the near-infrared range, and/or $1 \times 10^{-3}$ or less over the mid-infrared range.

7. The article of claim 6, wherein the surface reflectance of the article is $6 \times 10^{-4}$ or less over the visible range.

8. The article of claim 6, wherein the surface reflectance of the article is $10^{-5}$ or less over the UV, visible, near-infrared, and/or mid-infrared range.

9. The article of claim 8, wherein the surface reflectance of the article is $10^{-5}$ or less over the visible range.

10. The article of claim 6, wherein the surface reflectance is over a surface having an area of at least 1 mm$^2$.

11. The article of claim 1, wherein the article shows omni-directional blackbody optical absorption.

12. The article of claim 1, wherein the elongated carbon-based nanostructures comprise carbon nanotubes.

13. The article of claim 1, wherein the at least one metallic species comprises Fe and/or Co.

14. The article of claim 13, wherein the at least one metallic species comprises Fe and Co.

* * * * *

UNITED STATES PATENT AND TRADEMARK OFFICE
CERTIFICATE OF CORRECTION

PATENT NO. : 12,479,728 B2  
APPLICATION NO. : 17/413171  
DATED : November 25, 2025  
INVENTOR(S) : Brian L. Wardle et al.

Page 1 of 1

It is certified that error appears in the above-identified patent and that said Letters Patent is hereby corrected as shown below:

In the Claims

At Column 34, Claim 6, Line 33:
"...$6\times10^{-4}$ or less over the visible range, and/or $6\times104$ or less..."

Should read:
--...$6\times10^{-4}$ or less over the visible range, and/or $6\times10^{-4}$ or less...--

Signed and Sealed this  
Tenth Day of February, 2026

John A. Squires  
*Director of the United States Patent and Trademark Office*